(12) United States Patent
Melanson

(10) Patent No.: US 7,759,881 B1
(45) Date of Patent: Jul. 20, 2010

(54) LED LIGHTING SYSTEM WITH A MULTIPLE MODE CURRENT CONTROL DIMMING STRATEGY

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 12/058,971

(22) Filed: Mar. 31, 2008

(51) Int. Cl.
*H05B 37/02* (2006.01)

(52) U.S. Cl. .................. 315/307; 315/224; 315/293; 315/297

(58) Field of Classification Search .................. 315/247, 315/291, 293–294, 316, 209 R, 224, 297, 315/307–308; 362/227, 543, 555, 612, 800
See application file for complete search history.

(56) References Cited

U.S. PATENT DOCUMENTS

| 3,790,878 | A | 2/1974 | Brokaw |
| 3,881,167 | A | 4/1975 | Pelton et al |
| 4,075,701 | A | 2/1978 | Hofmann |
| 4,334,250 | A | 6/1982 | Theus |
| 4,414,493 | A | 11/1983 | Henrich |
| 4,476,706 | A | 10/1984 | Hadden et al. |
| 4,677,366 | A | 6/1987 | Wilkinson et al. |
| 4,683,529 | A | 7/1987 | Bucher |
| 4,700,188 | A | 10/1987 | James |
| 4,797,633 | A | 1/1989 | Humphrey |
| 4,940,929 | A | 7/1990 | Williams |
| 4,973,919 | A | 11/1990 | Allfather |
| 4,979,087 | A | 12/1990 | Sellwood et al. |
| 4,992,919 | A | 2/1991 | Lee et al. |

(Continued)

FOREIGN PATENT DOCUMENTS

EP 0585789 A1 3/1994

(Continued)

OTHER PUBLICATIONS

Texas Instruments, SLUS828, "8-Pin Continuous Conduction Mode (CCM) PFC Controller," UCC288019A, US, revised Apr. 20, 2009.

(Continued)

*Primary Examiner*—David Hung Vu
*Assistant Examiner*—Tung X Le
(74) *Attorney, Agent, or Firm*—Hamilton & Terrile, LLP; Kent B. Chambers

(57) ABSTRACT

A light emitting diode (LED) lighting system includes a controller to control current in one or more LEDs in response to a dimming level input. The LED lighting system implements a dimming strategy having two modes of operation that allow the LED lighting system to dim the LEDs using an active value of an LED current less than a full value LED current while maintaining continuous conduction mode operation. In an active value varying mode of operation, the controller varies an active value of the LED current for a first set of dimming levels. In an active value, duty cycle modulation mode of operation, the controller duty cycle modulates an active value of the LED current for a second set of dimming levels. In at least one embodiment, the active value of the LED current varies from a full active value to an intermediate active value as dimming levels decrease.

32 Claims, 10 Drawing Sheets

U.S. PATENT DOCUMENTS

| | | | |
|---|---|---|---|
| 4,994,952 | A | 2/1991 | Silva et al. |
| 5,206,540 | A | 4/1993 | de Sa e Silva et al. |
| 5,278,490 | A | 1/1994 | Smedley |
| 5,323,157 | A | 6/1994 | Ledzius et al. |
| 5,359,180 | A | 10/1994 | Park et al. |
| 5,383,109 | A | 1/1995 | Maksimovic et al. |
| 5,477,481 | A | 12/1995 | Kerth |
| 5,481,178 | A | 1/1996 | Wilcox et al. |
| 5,565,761 | A | 10/1996 | Hwang |
| 5,638,265 | A | 6/1997 | Gabor |
| 5,691,890 | A | 11/1997 | Hyde |
| 5,747,977 | A | 5/1998 | Hwang |
| 5,781,040 | A | 7/1998 | Myers |
| 5,783,909 | A | 7/1998 | Hochstein |
| 5,900,683 | A | 5/1999 | Rinehart et al. |
| 5,929,400 | A | 7/1999 | Colby et al. |
| 5,946,202 | A | 8/1999 | Balogh |
| 5,952,849 | A | 9/1999 | Haigh et al. |
| 5,963,086 | A | 10/1999 | Hall |
| 5,966,297 | A | 10/1999 | Minegishi |
| 5,994,885 | A | 11/1999 | Wilcox et al. |
| 6,016,038 | A | 1/2000 | Mueller et al. |
| 6,043,633 | A | 3/2000 | Lev et al. |
| 6,072,969 | A | 6/2000 | Yokomori et al. |
| 6,083,276 | A | 7/2000 | Davidson et al. |
| 6,084,450 | A | 7/2000 | Smith et al. |
| 6,150,774 | A | 11/2000 | Mueller et al. |
| 6,211,627 | B1 | 4/2001 | Callahan |
| 6,229,271 | B1 | 5/2001 | Liu |
| 6,246,183 | B1 | 6/2001 | Buonavita |
| 6,259,614 | B1 | 7/2001 | Ribarich et al. |
| 6,304,066 | B1 | 10/2001 | Wilcox et al. |
| 6,304,473 | B1 | 10/2001 | Telefus et al. |
| 6,344,811 | B1 | 2/2002 | Melanson |
| 6,385,063 | B1 | 5/2002 | Sadek et al. |
| 6,407,691 | B1 | 6/2002 | Yu |
| 6,445,600 | B2 | 9/2002 | Ben-Yaakov |
| 6,452,521 | B1 | 9/2002 | Wang |
| 6,509,913 | B2 | 1/2003 | Martin, Jr. et al. |
| 6,580,258 | B2 | 6/2003 | Wilcox et al. |
| 6,583,550 | B2 | 6/2003 | Iwasa et al. |
| 6,636,003 | B2 | 10/2003 | Rahm et al. |
| 6,713,974 | B2 | 3/2004 | Patchornik et al. |
| 6,727,832 | B1 | 4/2004 | Melanson |
| 6,741,123 | B1 | 5/2004 | Melanson et al. |
| 6,768,655 | B1 | 7/2004 | Yang et al. |
| 6,774,582 | B1 * | 8/2004 | Kwong et al. ............... 315/293 |
| 6,781,351 | B2 | 8/2004 | Mednik et al. |
| 6,788,011 | B2 | 9/2004 | Mueller et al. |
| 6,806,659 | B1 | 10/2004 | Mueller et al. |
| 6,839,247 | B1 | 1/2005 | Yang |
| 6,860,628 | B2 | 3/2005 | Robertson et al. |
| 6,870,325 | B2 | 3/2005 | Bushell et al. |
| 6,873,065 | B2 | 3/2005 | Haigh et al. |
| 6,882,552 | B2 | 4/2005 | Telefus et al. |
| 6,894,471 | B2 | 5/2005 | Corva et al. |
| 6,933,706 | B2 | 8/2005 | Shih |
| 6,940,733 | B2 | 9/2005 | Schie et al. |
| 6,944,034 | B1 | 9/2005 | Shteynberg et al. |
| 6,956,750 | B1 | 10/2005 | Eason et al. |
| 6,958,920 | B2 | 10/2005 | Mednik et al. |
| 6,970,503 | B1 | 11/2005 | Kalb |
| 7,003,023 | B2 | 2/2006 | Krone et al. |
| 7,050,509 | B2 | 5/2006 | Krone et al. |
| 7,064,531 | B1 | 6/2006 | Zinn |
| 7,075,329 | B2 | 7/2006 | Chen et al. |
| 7,078,963 | B1 | 7/2006 | Andersen et al. |
| 7,088,059 | B2 | 8/2006 | McKinney et al. |
| 7,102,902 | B1 | 9/2006 | Brown et al. |
| 7,106,603 | B1 | 9/2006 | Lin et al. |
| 7,109,791 | B1 | 9/2006 | Epperson et al. |
| 7,145,295 | B1 | 12/2006 | Lee et al. |
| 7,158,633 | B1 | 1/2007 | Hein |
| 7,161,816 | B2 | 1/2007 | Shteynberg et al. |
| 7,183,957 | B1 | 2/2007 | Melanson |
| 7,221,130 | B2 | 5/2007 | Ribeiro et al. |
| 7,233,135 | B2 | 6/2007 | Noma et al. |
| 7,256,554 | B2 | 8/2007 | Lys |
| 7,266,001 | B1 | 9/2007 | Notohamiprodjo et al. |
| 7,288,902 | B1 | 10/2007 | Melanson |
| 7,292,013 | B1 | 11/2007 | Chen et al. |
| 7,310,244 | B2 | 12/2007 | Yang et al. |
| 7,420,335 | B2 * | 9/2008 | Robinson et al. ............ 315/224 |
| 7,538,499 | B2 * | 5/2009 | Ashdown .................... 315/309 |
| 7,545,130 | B2 | 6/2009 | Latham |
| 7,569,996 | B2 * | 8/2009 | Holmes et al. ............... 315/291 |
| 2002/0145041 | A1 | 10/2002 | Muthu et al. |
| 2002/0150151 | A1 | 10/2002 | Krone et al. |
| 2002/0166073 | A1 | 11/2002 | Nguyen et al. |
| 2003/0095013 | A1 | 5/2003 | Melanson et al. |
| 2003/0223255 | A1 | 12/2003 | Ben-Yaakov |
| 2004/0046683 | A1 | 3/2004 | Mitamura et al. |
| 2004/0085030 | A1 | 5/2004 | Laflamme et al. |
| 2004/0085117 | A1 | 5/2004 | Melbert et al. |
| 2004/0169477 | A1 | 9/2004 | Yancie et al. |
| 2004/0227571 | A1 | 11/2004 | Kuribayashi |
| 2004/0228116 | A1 | 11/2004 | Miller et al. |
| 2004/0232971 | A1 | 11/2004 | Kawasake et al. |
| 2004/0239262 | A1 | 12/2004 | Ido et al. |
| 2005/0057237 | A1 | 3/2005 | Clavel |
| 2005/0156770 | A1 | 7/2005 | Melanson |
| 2005/0184895 | A1 | 8/2005 | Petersen et al. |
| 2005/0218838 | A1 | 10/2005 | Lys |
| 2005/0253533 | A1 | 11/2005 | Lys et al. |
| 2005/0275354 | A1 | 12/2005 | Hausman, Jr. et al. |
| 2006/0017402 | A1 * | 1/2006 | McKinney et al. .......... 315/291 |
| 2006/0022916 | A1 | 2/2006 | Aiello |
| 2006/0023002 | A1 | 2/2006 | Hara et al. |
| 2006/0125420 | A1 | 6/2006 | Boone et al. |
| 2006/0226795 | A1 | 10/2006 | Walter et al. |
| 2006/0261754 | A1 | 11/2006 | Lee |
| 2007/0029946 | A1 | 2/2007 | Yu et al. |
| 2007/0040512 | A1 | 2/2007 | Jungwirth et al. |
| 2007/0053182 | A1 | 3/2007 | Robertson |
| 2007/0103949 | A1 | 5/2007 | Tsuruya |
| 2007/0182347 | A1 * | 8/2007 | Shteynberg et al. ......... 315/312 |
| 2007/0182699 | A1 | 8/2007 | Ha et al. |
| 2008/0174372 | A1 | 7/2008 | Tucker et al. |
| 2008/0192509 | A1 | 8/2008 | Dhuyvetter et al. |
| 2008/0224635 | A1 | 9/2008 | Hayes |
| 2008/0259655 | A1 | 10/2008 | Wei et al. |
| 2008/0278132 | A1 | 11/2008 | Kesterson et al. |
| 2009/0134817 | A1 * | 5/2009 | Jurngwirth et al. .......... 315/307 |
| 2009/0147544 | A1 | 6/2009 | Melanson |
| 2009/0218960 | A1 * | 9/2009 | Lyons et al. ................. 315/297 |

FOREIGN PATENT DOCUMENTS

| | | |
|---|---|---|
| EP | 0910168 A1 | 4/1999 |
| EP | 1014563 | 6/2000 |
| EP | 1164819 A | 12/2001 |
| EP | 1213823 A2 | 6/2002 |
| EP | 1528785 A | 5/2005 |
| WO | 01/97384 A | 12/2001 |
| WO | WO0227944 | 4/2002 |
| WO | 02/091805 A2 | 11/2002 |
| WO | WO 2006/022107 A2 | 3/2006 |
| WO | 2006/067521 A | 6/2006 |
| WO | WO2006135584 | 12/2006 |
| WO | 2007/026170 A | 3/2007 |

WO 2007/079362 A 7/2007

OTHER PUBLICATIONS

Analog Devices, "120 kHz Bandwidth, Low Distortion, Isolation Amplifier", Tucson, AZ, Mar. 1992.
Burr-Brown, ISO120 and ISO121, "Precision Low Cost Isolation Amplifier," Tucson, AZ, Mar. 1992.
Burr-Brown, ISO130, "High HMR, Low Cost Isolation Amplifier," SB)S220, US, Oct. 2001.
Freescale Semiconductor, Inc., Dimmable Light Ballast with Power Factor Correction, Design Reference Manual, DRM067, Rev. 1, Dec. 2005.
J. Zhou et al., Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunication Energy Conference.
Dallas Semiconductor, Maxim, "Charge-Pump and Step-Up DC-DC Converter Solutions for Powering White LEDs in Series or Parallel Connections," Apr. 23, 2002.
Freescale Semiconductor, AN3052, Implementing PFC Average Current Mode Control Using the MC9S12E128, Nov. 2005.
D. Maksimovic et al., "Switching Converters with Wide DC Conversion Range," Institute of Electrical and Electronic Engineer's (IEEE) Transactions on Power Electronics, Jan. 1991.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
S. Zhou et al., "A High Efficiency, Soft Switching DC-DC Converter wth Adaptive Current-Ripple Control for Portable Applications," IEEE Transactions on Circuits and Systems—II: Express Briefs, vol. 53, No. 4, Apr. 2006.
K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
Y. Ohno, Spectral Design Considerations for White LED Color Rendering, Final Manuscript, Optical Engineering, vol. 44, 111302 (2005).
S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.
J. Turchi, Four Key Steps to Design a Continuous Mode PFC Stage Using the NCP1653, ON Semiconductor, Publication Order No. AND184/D, Nov. 2004.
Megaman, D or S Dimming ESL, Product News, Mar. 15, 2007.
J. Qian et al., New Charge Pump Power-Factor-Correction Electronic Ballast with a Wide Range of Line Input Voltage, IEEE Transactions on Power Electronics, vol. 14, No. 1, Jan. 1999.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
J. Qian et al., Charge Pump-Power-Factor-Correction Technologies Part II: Ballast Applications, IEEE Transactions on Power Electronics, vol. 15, No. 1, Jan. 2000.
Chromacity Shifts in High-Power White LED Systems due to Different Dimming Methods, Solid-State Lighting, http://www.lrc.rpi.edu/programs/solidstate/completedProjects.asp?ID=76, printed May 3, 2007.
S. Chan et al., Design and Implementation of Dimmable Electronic Ballast Based in Integrated Inductor, IEEE Transactions on Power Electronics, vol. 22, No. 1, Jan. 2007.

M. Madigan et al., Integrated High-Quality Rectifier-Regulators, IEEE Transactions on Industrial Electronics, vol. 46, No. 4, August 1999.
T. Wu et al., Single-Stage Electronic Ballast with Dimming Feature and Unity Power Factor, IEEE Transactions on Power Electronics, vol. 13, No. 3, May 1998.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
AZOTEQ, IQS17 Family, IQ Switch®—ProxSense™ Series, Touch Sensor, Load Control and User Interface, IQS17 Datasheet V2.00.doc, Jan. 2007.
C. Dilouie, Introducing the LED Driver, EC&M, Sep. 2004.
S. Lee et al., TRIAC Dimmable Ballast with Power Equalization, IEEE Transactions on Power Electronics, vol. 20, No. 6, Nov. 2005.
L. Gonthier et al., EN55015 Complaint 500W Dimmer with Low-Losses Symmetrical Switches, 2005 European Conference on Power Electronics and Applications, Sep. 2005.
Why Different Dimming Ranges? The Difference Between Measured and Perceived Light, 2000 http://www.lutron.com/ballast/pdf/LutronBallastpg3.pdf.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al. Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
Supertex Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference 2007.
Supertex Inc., HV9931 Unity Power Factor LED Lamp Driver, Application Note AN-H52, Mar. 7, 2007.
Supertex Inc., 56W Off-line LED Driver, 120VAC with PFC, 160V, 350mA Load, Dimmer Switch Compatible, DN-H05, Feb. 2007.
ST Microelectronics, Power Factor Corrector L6561, Jun. 2004.
Fairchild Semiconductor, Application Note 42047 Power Factor Correction (PFC) Basics, Rev. 0.9.0 Aug. 19, 2004.
M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, ML4821, Power Factor Controller, Jun. 19, 2001.
Freescale Semiconductor, AN1965, Design of Indirect Power Factor Correction Using 56F800/E, Jul. 2005.
International Search Report for PCT/US2008/051072, mailed Jun. 4, 2008.

Infineon, CCM-PFC Standalone Power Factor Correction (PFC) Controller in Continuous Conduction Mode (CCM), Version 2.1, Feb. 6, 2007.

International Rectifier, IRAC1150-300W Demo Board, User's Guide, Rev 3.0, Aug. 2, 2005.

International Rectifier, Application Note AN-1077, PFC Converter Design with IR1150 One Cycle Control IC, rev. 2.3, Jun. 2005.

International Rectifier, Data Sheet PD60230 revC, Feb. 5, 2007.

Lu et al, International Rectifier, Bridgeless PFC Implementation Using One Cycle Control Technique, 2005.

Linear Technology, LT1248, Power Factor Controller, Apr. 20, 2007.

On Semiconductor, AND8123/D, Power Factor Correction Stages Operating in Critical Conduction Mode, Sep. 2003.

On Semiconductor, MC33260, GreenLine Compact Power Factor Controller: Innovative Circuit for Cost Effective Solutions, Sep. 2005.

On Semiconductor, NCP1605, Enhanced, High Voltage and Efficient Standby Mode, Power Factor Controller, Feb. 2007.

On Semconductor, NCP1606, Cost Effective Power Factor Controller, Mar. 2007.

On Semiconductor, NCP1654, Product Review, Power Factor Controller for Compact and Robust, Continuous Conduction Mode Pre-Converters, Mar. 2007.

Philips, Application Note, 90W Resonant SMPS with TEA1610 SwingChip, AN99011, 1999.

NXP, TEA1750, GreenChip III SMPS control IC Product Data Sheet, Apr. 6, 2007.

Renesas, HA16174P/FP, Power Factor Correction Controller IC, Jan. 6, 2006.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

STMicroelectronics, L6563, Advanced Transition-Mode PFC Controller, Mar. 2007.

Texas Instruments, Application Note SLUA321, Startup Current Transient of the Leading Edge Triggered PFC Controllers, Jul. 2004.

Texas Instruments, Application Report, SLUA309A, Avoiding Audible Noise at Light Loads when using Leading Edge Triggered PFC Converters, Sep. 2004.

Texas Instruments, Application Report SLUA369B, 350-W, Two-Phase Interleaved PFC Pre-Regulator Design Review, Mar. 2007.

Unitrode, High Power-Factor Preregulator, Oct. 1994.

Texas Instruments, Transition Mode PFC Controller, SLUS515D, Jul. 2005.

Unitrode Products From Texas Instruments, Programmable Output Power Factor Preregulator, Dec. 2004.

Unitrode Products From Texas Instruments, High Performance Power Factor Preregulator, Oct. 2005.

Texas Instruments, UCC3817 BiCMOS Power Factor Preregulator Evaluation Board User's Guide, Nov. 2002.

Unitrode, L. Balogh, Design Note UC3854A/B and UC3855A/B Provide Power Limiting with Sinusoidal Input Current for PFC Front Ends, SLUA196A, Nov. 2001.

A. Silva De Morais et al., A High Power Factor Ballast Using a Single Switch with Both Power Stages Integrated, IEEE Transactions on Power Electronics, vol. 21, No. 2, Mar. 2006.

M. Ponce et al., High-Efficient Integrated Electronic Ballast for Compact Fluorescent Lamps, IEEE Transactions on Power Electronics, vol. 21, No. 2, Mar. 2006.

A. R. Seidel et al., A Practical Comparison Among High-Power-Factor Electronic Ballasts with Similar Ideas, IEEE Transactions on Industry Applications, vol. 41, No. 6, Nov.-Dec. 2005.

F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

J. A. Vilela Jr. et al., An Electronic Ballast with High Power Factor and Low Voltage Stress, IEEE Transactions on Industry Applications, vol. 41, No. 4, Jul./Aug. 2005.

S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.

M. K. Kazimierczuk et al., Electronic Ballast for Fluorescent Lamps, IEEE Transactions on Power Electronics, vol. 8, No. 4, Oct. 1993.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

H. L. Cheng et al., A Novel Single-Stage High-Power-Factor Electronic Ballast with Symmetrical Topology, IEEE Transactions on Power Electronics, vol. 50, No. 4, Aug. 2003.

J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.

Q. Li et al., An Analysis of the ZVS Two-Inductor Boost Converter under Variable Frequency Operation, IEEE Transactions on Power Electronics, vol. 22, No. 1, Jan. 2007.

H. Peng et al., Modeling of Quantization Effects in Digitally Controlled DC-DC Converters, IEEE Transactions on Power Electronics, vol. 22, No. 1, Jan. 2007.

G. Yao et al., Soft Switching Circuit for Interleaved Boost Converters, IEEE Transactions on Power Electronics, vol. 22, No. 1, Jan. 2007.

C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.

W. Zhang et al., A New Duty Cycle Control Strategy for Power Factor Correction and FPGA Implementation, IEEE Transactions on Power Electronics, vol. 21, No. 6, Nov. 2006.

H. Wu et al., Single Phase Three-Level Power Factor Correction Circuit with Passive Lossless Snubber, IEEE Transactions on Power Electronics, vol. 17, No. 2, Mar. 2006.

O. Garcia et al., High Efficiency PFC Converter to Meet EN61000-3-2 and A14, Proceedings of the 2002 IEEE International Symposium on Industrial Electronics, vol. 3, 2002.

P. Lee et al., Steady-State Analysis of an Interleaved Boost Converter with Coupled Inductors, IEEE Transactions on Industrial Electronics, vol. 47, No. 4, Aug. 2000.

D.K.W. Cheng et al., A New Improved Boost Converter with Ripple Free Input Current Using Coupled Inductors, Power Electronics and Variable Speed Drives, Sep. 21-23, 1998.

B.A. Miwa et al., High Efficiency Power Factor Correction Using Interleaved Techniques, Applied Power Electronics Conference and Exposition, Seventh Annual Conference Proceedings, Feb. 23-27, 1992.

Z. Lai et al., A Family of Power-Factor-Correction Controllers, Twelfth Annual Applied Power Electronics Conference and Exposition, vol. 1, Feb. 23, 1997-Feb. 27, 1997.

L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.

Fairchild Semiconductor, Application Note 42030, Theory and Application of the ML4821 Average Current Mode PFC Controller, Oct. 25, 2000.

Unitrode Products From Texas Instruments, BiCMOS Power Factor Preregulator, Feb. 2006.

Power Integrations, Inc., "TOP200-4/14 TOPSwitch Family Three-terminal Off-line PWM Switch", XP-002524650, Jul. 1996, Sunnyvale, California.

Texas Instruments, SLOS318F, "High-Speed, Low Noise, Fully-Differential I/O Amplifiers," THS4130 and THS4131, US, Jan. 2006.

International Search Report and Written Opinion, PCT US20080062398, dated Feb. 5, 2008.

International Search Report Written Opinion PCT US2008051072, dated Feb. 19, 2007.

International Search Report and Written Opinion, PCT US20080062387, dated Feb. 5, 2008.

International Search Report and Written Opinion, PCT US200900032358, dated Jan. 29, 2009.
Hirota, Atsushi et al, "Analysis of Single Switch Delta-Sigma Modulated Pulse Space Modulation PFC Converter Effectively Using Switching Power Device," IEEE, US, 2002.
Prodic, Aleksandar, "Digital Controller for High-Frequency Rectifiers with Power Factor Correction Suitable for On-Chip Implementation," IEEE, US, 2007.
International Search Report and Written Opinion, PCT US20080062378, dated Feb. 5, 2008.
International Search Report and Written Opinion, PCT US20090032351, dated Jan. 29, 2009.
Erickson, Robert W. et al, "Fundamentals of Power Electronics," Second Edition, Chapter 6, Boulder, CO, 2001.
Allegro Microsystems, A 1442, "Low Voltage Full Bridge Brushless DC Motor Driver with Hall Commutation and Soft-Switching, and Reverse Battery, Short Circuit, and Thermal Shutdown Protection," Worcester MA, 2009.
Prodic, A. et al, "Dead Zone Digital Controller for Improved Dynamic Response of Power Factor Preregulators," IEEE, 2003.
International Search Report and Written Opinion PCT US20080062428 dated Feb. 5, 2008.
"HV9931 Unity Power Factor LED Lamp Driver, Initial Release" 2005, Supertex Inc., Sunnyvale, CA USA.
AN-H52 Application Note: "HV9931 Unity Power Factor LED Lamp Driver" 7 Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Conference, 2007. PESC 2007, IEEE, IEEE, P1, Jun. 1, 2007, pp. 1398-1404.
Spiazzi G et al: "Analysis of a High-Power-Factor Electronic Ballast for High Brightness Light Emitting Diodes" Power Electronics Specialists, 2005 IEEE 36th Conference on Jun. 12, 2005, Piscatawa, NJ USA, IEEE, Jun. 12, 2005, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search PCT/US2008/062387 dated Feb. 5, 2008.
Noon, Jim "UC3855A/B High Performance Power Factor Preregulator", Texas Instruments, SLUA146A, May 1996, Revised Apr. 2004.
"High Performance Power Factor Preregulator", Unitrode Products from Texas Instruments, SLUS382B, Jun. 1998, Revised Oct. 2005.
International Search Report PCT/GB2006/003259 dated Jan. 12, 2007.
Written Opinion of the International Searching Authority PCT/US2008/056739.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.

Written Opinion of the International Searching Authority PCT/US2008/056608 dated Dec. 3, 2008.
International Search Report PCT/GB2005/050228 dated Mar. 14, 2006.
International Search PCT/US2008/062387 dated Jan. 10, 2008.
Data Sheet LT3496 Triple Output LED Driver, 2007, Linear Technology Corporation, Milpitas, CA.
D. Hausman, Lutron, RTISS-TE Operation, Real-Time Illumination Stability Systems for Trailing-Edge (Reverse Phase Control) Dimmers, v. 1.0 Dec. 2004.
International Rectifier, Data Sheet No. PD60230 revC, IR1150(S)(PbF), uPFC One Cycle Control PFC IC Feb. 5, 2007.
Texas Instruments, Application Report SLUA308, UCC3817 Current Sense Transformer Evaluation, Feb. 2004.
Texas Instruments, Application Report SPRA902A, Average Current Mode Controlled Power Factor Correctiom Converter using TMS320LF2407A, Jul. 2005.
Unitrode, Design Note DN-39E, Optimizing Performance in UC3854 Power Factor Correction Applications, Nov. 1994.
Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev.1.0.1, May 30, 2002.
Fairchild Semiconductor, Application Note 6004, 500W Power-Factor-Corrected (PFC) Converter Design with FAN4810, Rev. 1.01, Oct. 31, 2003.
Fairchild Semiconductor, FAN4822, ZVA Average Current PFC Controller, Rev. 1.0.1 Aug. 10, 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Fairchild Semiconductor, FAN7544, Simple Ballast Controller, Rev. 1.0.0, 2004.
Fairchild Semiconductor, FAN7532, Ballast Controller, Rev. 1.0.2, Jun. 2006.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
Linear Technology, "Single Switch PWM Controller with Auxiliary Boost Converter," LT1950 Datasheet, Linear Technology, Inc., Milpitas, CA, 2003.
Yu, Zhenyu, 3.3V DSP for Digital Motor Control, Texas Instruments, Application Report SPRA550 dated Jun. 1999.
International Rectifier, Data Sheet No. PD60143-O, Current Sensing Single Channel Driver, El Segundo, CA, dated Sep. 8, 2004.

\* cited by examiner

LED LIGHTING SYSTEM WITH A MULTIPLE MODE CURRENT CONTROL DIMMING STRATEGY

CROSS REFERENCE TO RELATED APPLICATIONS

U.S. Provisional Application No. 60/909,458, entitled "Ballast for Light Emitting Diode Light Sources," inventor John L. Melanson, and filed on Apr. 1, 2007 describes exemplary methods and systems and is incorporated by reference in its entirety. Referred to herein as "Melanson I".

U.S. patent application Ser. No. 12/047,249, entitled "Ballast for Light Emitting Diode Light Sources," inventor John L. Melanson, and filed on Mar. 12, 2008 describes exemplary methods and systems and is incorporated by reference in its entirety. Referred to herein as "Melanson II".

U.S. patent application Ser. No. 12/047,269, entitled "Lighting System with Power Factor Correction Control Data Determined from a Phase Modulated Signal," inventor John L. Melanson, and filed on Mar. 12, 2008 describes exemplary methods and systems and is incorporated by reference in its entirety. Referred to herein as "Melanson III".

U.S. patent application Ser. No. 11/695,024, entitled "Lighting System with Lighting Dimmer Output Mapping," inventors John L. Melanson and John Paulos, and filed on Apr. 1, 2007 describes exemplary methods and systems and is incorporated by reference in its entirety. Referred to herein as "Melanson IV".

U.S. patent application Ser. No. 11/864,366, entitled "Time-Based Control of a System having Integration Response," inventor John L. Melanson, and filed on Sep. 28, 2007 describes exemplary methods and systems and is incorporated by reference in its entirety. Referred to herein as Melanson V.

U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 describes exemplary methods and systems and is incorporated by reference in its entirety. Referred to herein as Melanson VI.

U.S. patent application Ser. No. 11/967,271, entitled "Power Factor Correction Controller with Feedback Reduction," inventor John L. Melanson, and filed on Dec. 31, 2007 describes exemplary methods and systems and is incorporated by reference in its entirety. Referred to herein as Melanson VII.

U.S. patent application Ser. No. 11/967,273, entitled "System and Method with Inductor Flyback Detection Using Switch Date Charge Characteristic Detection," inventor John L. Melanson, and filed on Dec. 31, 2007 describes exemplary methods and systems and is incorporated by reference in its entirety. Referred to herein as Melanson VIII.

U.S. patent application Ser. No. 11/967,275, entitled "Programmable Power Control System," inventor John L. Melanson, and filed on Dec. 31, 2007 describes exemplary methods and systems and is incorporated by reference in its entirety. Referred to herein as Melanson IX.

U.S. patent application Ser. No. 11/967,272, entitled "Power Factor Correction Controller With Switch Node Feedback", inventor John L. Melanson, and filed on Dec. 31, 2007 describes exemplary methods and systems and is incorporated by reference in its entirety. Referred to herein as Melanson X.

BACKGROUND OF THE INVENTION

1. Field of the Invention

The present invention relates in general to the field of electronics and lighting, and more specifically to a system and method related to controlling an active light emitting diode current using a multiple mode dimming strategy.

2. Description of the Related Art

Commercially practical incandescent light bulbs have been available for over 100 years. However, other light sources show promise as commercially viable alternatives to the incandescent light bulb. LEDs are becoming particularly attractive as main stream light sources in part because of energy savings through high efficiency light output and environmental incentives such as the reduction of mercury.

LEDs are semiconductor devices and are driven by direct current. The lumen output intensity (i.e. brightness) of the LED approximately varies in direct proportion to the current flowing through the LED. Thus, increasing current supplied to an LED increases the intensity of the LED and decreasing current supplied to the LED dims the LED, i.e. decreases the brightness of the LED. Current can be modified by either directly reducing the direct current level to the white LEDs or by reducing the average current through duty cycle modulation.

Dimming a light source saves energy when operating a light source and also allows a user to adjust the intensity of the light source to a desired level. Many facilities, such as homes and buildings, include light source dimming circuits (referred to herein as "dimmers").

FIG. 1 depicts an LED lighting system 100 that supplies power to light emitting diodes (LEDs) 102 and dims the LEDs 102 in accordance with a dimming level indicated by the phase modulated signal $V_\Phi$. The voltage source 104 supplies an alternating current (AC) input voltage $V_{IN}$. The dimmer 106 is, for example, a phase cut dimmer that generates phase delays in the input voltage $V_{IN}$ to generate a phase modulated input signal. Full, diode bridge rectifier 108 rectifies the input voltage $V_{IN}$ to generate the phase modulated signal $V_\Phi$. The voltage source 104 is, for example, a public utility, and the input voltage $V_{DIM}$ is, for example, a 60 Hz/120 V voltage in the United States of America or a 50 Hz/230 V voltage in Europe. The phase delays indicate dimming levels. Generally, as the phase delays increase, the dimming level decreases, i.e. as the phase delays increase, the dimming level indicates a lower brightness level for LEDs 102. The Background sections of Melanson I, Melanson II, and Melanson III, describe examples of dimmer 106.

Switching power supply 110 utilizes switching power converter technology to convert the phase modulated signal $V_\Phi$ into an output voltage $V_{OUT}$. The output voltage $V_{OUT}$ is sufficient to bias the LEDs 102. Switching power supply 110 also supplies an LED current $i_{LED}$ to illuminate the LEDs 102.

Current controller 112 controls active and average values of LED current $i_{LED}$ by controlling the conductivity of n-channel field effect transistor (FET) Q1. Current controller 112 generates a gate control signal $C_{G0}$ to charge and discharge a gate of FET Q1. The control signal $C_{G0}$ has two relevant frequencies, an active frequency and a duty cycle modulated frequency. During an active period of LED current $i_{LED}$, the control signal $C_{G0}$ has an active frequency in the range of, for example, 20 kHz to 500 kHz. As described subsequently in more detail, the duty cycle modulated frequency is less than the active frequency. The active period of LED current $i_{LED}$ is the period of time when the average value of LED current $i_{LED}$ equals $i_{FULL}$. The time period for this average is, for example, one or a few (such as 3-5) periods of the active frequency.

When the control signal $C_{G0}$ is a logical "one", FET Q1 conducts, i.e. is "ON", and when the control signal $C_{G0}$ is a logical "zero", FET Q1 is nonconductive, i.e. is "OFF". When the FET Q1 is "ON", diode D1 is reversed bias and, LED current $i_{LED}$ flows through the LEDs 102 and charges inductor $L_1$. When FET Q1 is "OFF", the voltage across inductor $L_1$ changes polarity, and diode $D_1$ creates a current path for the LED current $i_{LED}$. The inductor $L_1$ is chosen so as to store enough energy to maintain an approximately constant active value of LED current $i_{LED}$ when MOSFET Q1 is "OFF". Capacitor C1 helps "smooth" LED current $i_{LED}$. As subsequently explained in more detail, the active value of the LED current $i_{LED}$ is the average LED current $i_{LED}$ when the current control system 112 is active, i.e. during the active period of LED current $i_{LED}$. The LED current $i_{LED}$ includes a ripple 201 due to, for example, the charging and discharging of inductor L1. The frequency of the ripple 201 is the active frequency. It is desirable, for LED efficiency, to keep the LED current relatively constant, to reduce heating effects.

FIG. 2 depicts a graphical representation 200 of the LED current $i_{LED}$ for various dimming levels indicated by the phase modulated signal $V_\Phi$. Referring to FIGS. 1 and 2, when the phase modulated signal $V_\Phi$ indicates a full dimming level, i.e. full brightness for LEDs 102, current controller 112 controls the LED current $i_{LED}$ so that the active value of LED current $i_{LED}$ is continuous and constant over time and equals $i_{FULL}$, as indicated by LED current $i_{LED}$ waveform 202. "$i_{FULL}$" represents the active value of LED current $i_{LED}$ that causes the LEDs 102 to illuminate at full brightness.

The current controller 112 uses feedback information from feedback signal $LEDi_{sense}$ to sense the active value of LED current $i_{LED}$. The feedback signal $LEDi_{sense}$ represents a voltage $V_{fb}$ across sense resistor $R_{SENSE}$. The voltage $V_{fb}$ represents LED current $i_{LED}$ when FET Q1 is ON. Thus, from the feedback signal $LEDi_{sense}$, the current controller 112 obtains the value of LED current $i_{LED}$ and can adjust the duty cycle of control signal $C_{G0\_FULL}$ to maintain the active value of LED current $i_{LED}$ at the full active value $i_{FULL}$ during the active period of LED current $i_{LED}$. As subsequently explained in more detail, the control signal $C_{G0\_FULL}$ is also duty cycle modulated at the duty cycle modulation frequency in response to dimming levels indicated by phase modulated signal $V_\Phi$ to generate control signal $C_{G0}$.

To determine the dimming level indicated by phase modulated signal $V_\Phi$, comparator 114 compares the phase modulated signal $V_\Phi$ with a phase delay detection reference signal $V_{DET}$. The value of phase delay detection reference signal $V_{DET}$ is set to detect an edge of any phase delays in the phase modulated signal $V_\Phi$. Generally, the edge of any phase delays during each cycle of phase modulated signal $V_\Phi$ results in a voltage increase in phase modulated signal $V_\Phi$. Thus, generally, the value of phase delay detection reference signal $V_{DET}$ is set low enough, so that the output of comparator 114 changes from a logical 0 to a logical 1 when a rising edge associated with an end to a phase delay is detected and changes to a logical 0 if a phase delay is detected during a cycle of phase modulated signal $V_\Phi$.

Comparator 114 generates a duty cycle modulated enable signal EN at the duty cycle modulation frequency. The duty cycle of enable signal EN corresponds to the dimming level indicated by phase modulated signal $V_\Phi$. The current controller 112 responds to the enable signal EN by duty cycle modulating the control signal $C_{G0}$ so that the average value, $i_{LED\_AVG}$, of LED current $i_{LED}$ varies in accordance with dimming levels indicated by the phase modulated signal $V_\Phi$. Modulator 116 represents a logical representation of utilizing the enable signal EN to generate a duty cycle modulated control signal $C_{G0}$. The enable signal EN represents one input signal to AND gate 118, and control signal $C_{G0\_FULL}$ represents another input signal to AND gate 118. The AND gate 118 is exemplary. In typical applications, the function of the AND gate 118 is integrated into the logic of the controller 112. Control signal $C_{G0\_FULL}$ corresponds to control signal $C_{G0}$ during the active period of LED current $i_{LED}$. When the enable signal EN is a logical 1, the control signal $C_{G0}$ equals the control signal $C_{G0\_FULL}$. When the enable signal EN is a logical 0, the control signal $C_{G0}$ equals 0. Thus, the control signal $C_{G0}$ is duty cycle modulated to generate the control signal $C_{G0\_FULL}$ and is duty cycle modulated in response to the phase modulated signal $V_\Phi$.

For example, referring to LED current $i_{LED}$ waveform 204, when the phase modulated signal $V_\Phi$ indicates a ¾ dimming level, the duty cycle of enable signal EN is 0.75. The enable signal EN causes the current controller 112 to duty cycle modulate the control signal $C_{G0}$ with the same duty cycle as enable signal EN so that time period $T_{ACTIVE\_3/4}$/T equals 0.75. Thus, the active period of LED current $i_{LED}$ equals $T_{ACTIVE\_3/4}$ for each period T of phase modulated signal $V_\Phi$ while the phase modulated signal $V_\Phi$ indicates a ¾ dimming level. Period T represents a duty cycle modulated period, and the duty cycle modulated frequency equals 1/T. The average LED current $i_{LED\_AVG}$ equals $i_{FULL}$ (the active value of LED current $i_{LED}$) times the duty cycle of enable signal EN. For a ¾ dimming level, the average LED current $i_{LED\_AVG}$ equals $0.75 \cdot i_{FULL}$. During the inactive period of LED current $i_{LED}$, i.e. between the end of the active period $T_{ACTIVE\_3/4}$ and the beginning of the next period of phase modulated signal $V_\Phi$, the LED current $i_{LED}$ is zero.

Referring to LED current $i_{LED}$ waveform 206, when the phase modulated signal $V_\Phi$ indicates a ⅛ dimming level, the duty cycle of enable signal EN is 0.125. The enable signal EN causes the current controller 112 to duty cycle modulate the control signal $C_{G0}$ with the same duty cycle as enable signal EN so that time period $T_{ACTIVE\_1/8}$/T equals 0.125. Thus, the active period of LED current $i_{LED}$ equals $T_{ACTIVE\_1/8}$ for each period T of phase modulated signal $V_\Phi$ while the phase modulated signal $V_\Phi$ indicates a ⅛ dimming level. The average LED current $i_{LED\_AVG}$ equals $i_{FULL}$ times the duty cycle of enable signal EN. For a ⅛ dimming level, the average LED current $i_{LED\_AVG}$ equals $0.125 \cdot i_{FULL}$. During the inactive period of LED current $i_{LED}$, i.e. between the end of the active period $T_{ACTIVE\_1/8}$ and the beginning of the next period of phase modulated signal $V_\Phi$, the LED current $i_{LED}$ is zero.

FIG. 3 depicts a graphical relationship 300 between each dimming level indicated by phase modulated signal $V_\Phi$ and the LED current $i_{LED}$, the enable signal EN, and the average value of LED current $i_{LED}$, $i_{LED\_AVG}$. The current controller 112 maintains the active value of LED current $i_{LED}$ at $i_{FULL}$ for all dimming levels. The duty cycle of the enable signal EN varies from 0 to 1.0 as the dimming level varies from 0, i.e. LEDs 102 OFF, to full intensity, i.e. LEDs 102 at full brightness. By modulating the LED current $i_{LED}$ in accordance with the enable signal EN, the LED average current $i_{LED\_AVG}$ varies as the dimming level varies.

During inactive periods of LED current $i_{LED}$, the LEDs 102 can noticeably flicker, especially at lower dimming levels when the LED current $i_{LED}$ is inactive for longer periods of time during each period of phase modulated signal $V_\Phi$. Additionally, the high active value $i_{FULL}$ of LED current $i_{LED}$ causes inductor L1 to generate more noise and heat during the active period relative to a lower value of LED current $i_{LED}$.

Furthermore, generally, LED lighting system 100 operates less efficiently with higher values of active current value of LED current $i_{LED}$. Additionally, dimming the LEDs 102 as described with reference to FIGS. 1-3 can cause color variations in the output light of the LEDs 102.

SUMMARY OF THE INVENTION

In one embodiment of the present invention, a light emitting diode (LED) lighting system includes a controller to control current in an LED. The controller includes components to respond to a dimming level input to control an active value of the LED current. For a first set of dimming levels, the active value varies between a full active value and an intermediate active value of the LED current. For a second set of dimming levels, the LED current is duty cycle modulated.

In another embodiment of the present invention, a method of controlling an LED lighting system includes receiving a dimmer signal indicating a dimming level and controlling an active value of a current in an LED in response to the dimming level. Controlling the active value of the LED current includes, for a first set of dimming levels, varying the active value between a full active value and an intermediate active value of the LED current and, for a second set of dimming levels, duty cycle modulating the LED current.

In a further embodiment of the present invention, an apparatus for controlling an LED lighting system includes means for receiving a dimmer signal indicating a dimming level. The apparatus further includes means for controlling an active value of a current in an LED in response to the dimming level. The means for controlling the active value of the LED current includes, for a first set of dimming levels, means for varying the active value between a full active value and an intermediate active value of the LED current and, for a second set of dimming levels, means for duty cycle modulating the LED current.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A light emitting diode (LED) lighting system includes a controller to control current in one or more LEDs in response to a dimming level input. The LED lighting system implements a dimming strategy having two modes of operation that allow the LED lighting system to dim the LEDs using an active value of an LED current less than a full value of the LED current while maintaining continuous conduction mode operation. In an active value varying mode of operation, the controller varies an active value of the LED current for a first set of dimming levels. In an active value, duty cycle modulation mode of operation, the controller duty cycle modulates an active value of the LED current for a second set of dimming levels. In at least one embodiment, the active value of the LED current varies from a full active value to an intermediate active value as dimming levels decrease.

In at least one embodiment, upon reaching the intermediate active value, the controller modulates a duty cycle of the LED current with the LED current at the intermediate active value during an active period to achieve a full range of dimming while reducing the peak LED current. Thus, the LED lighting system is generally more efficient than conventional LED lighting systems because the LED lighting system utilizes a lower LED current. In at least one embodiment, the intermediate active value of the LED current is set to operate an inductor coupled to each LED in continuous conduction mode to eliminate complexities involved with operating the inductor in discontinuous conduction mode. Additionally, the inductor generally generates less noise than the inductor in a conventional dimming system that maintains the LED current at a full active value during an active period of the LED current.

Additionally, in at least one embodiment, the inactive period of the LED current for the present LED lighting system has a shorter duration than the inactive period of the LED current in a conventional LED lighting system, such as lighting system 100, for a particular dimming level. Thus, the present LED lighting system exhibits less flicker for a particular dimming level.

Figure 1:
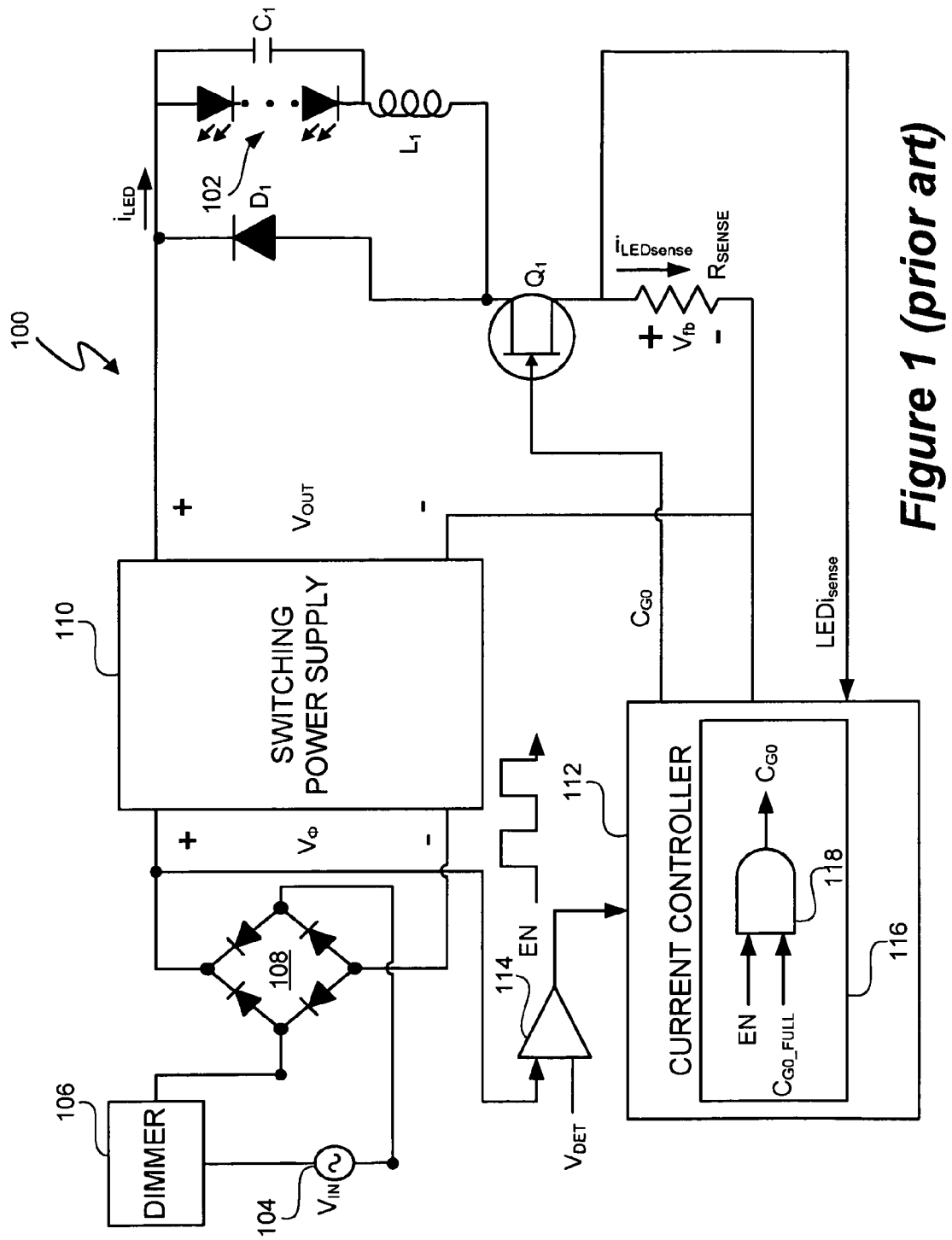
FIG. 1 (labeled prior art) depicts an LED lighting system.
Figure 2:
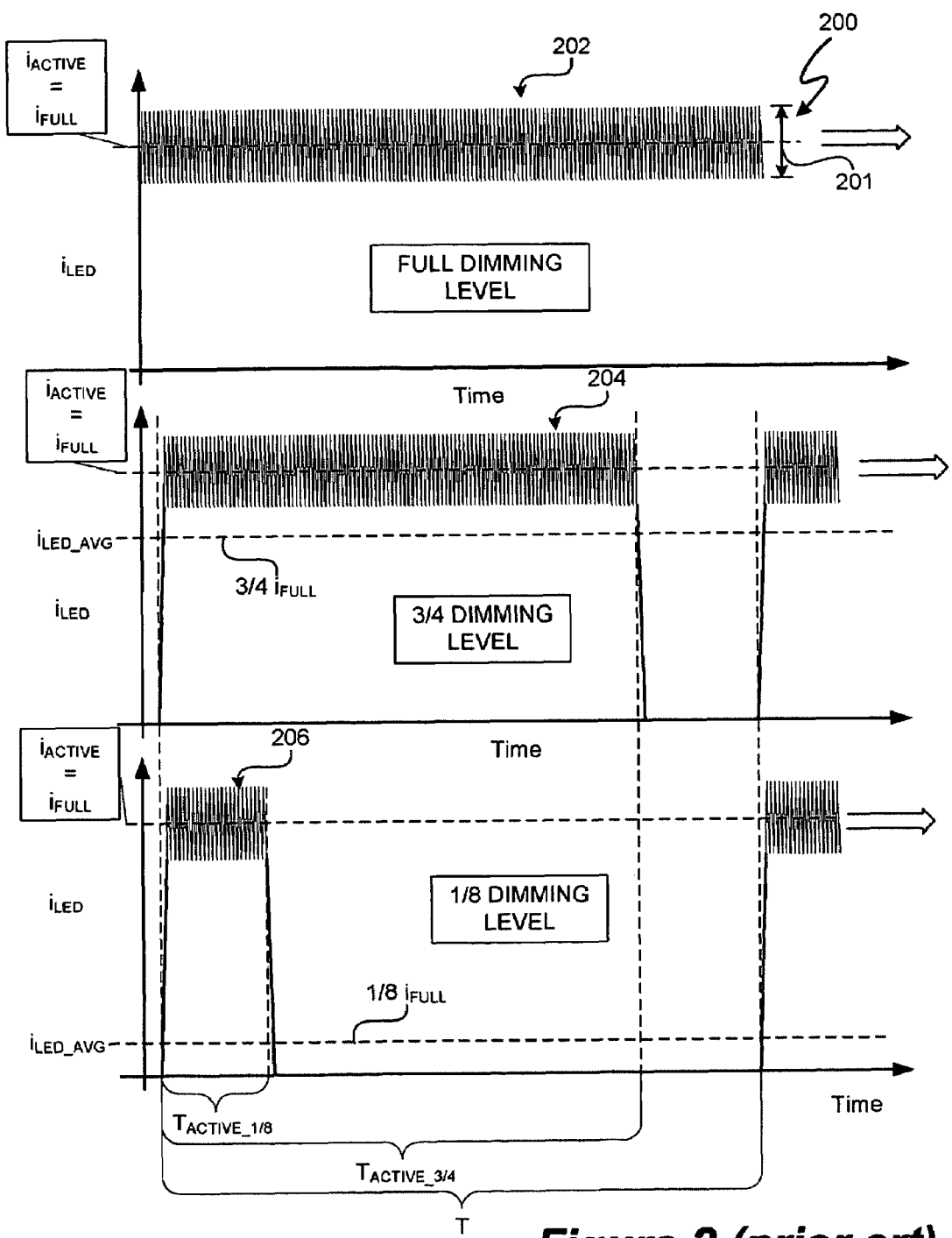
FIG. 2 (labeled prior art) depicts a graphical representation of LED current in the LED lighting system of FIG. 1 for various dimming levels.
Figure 3:
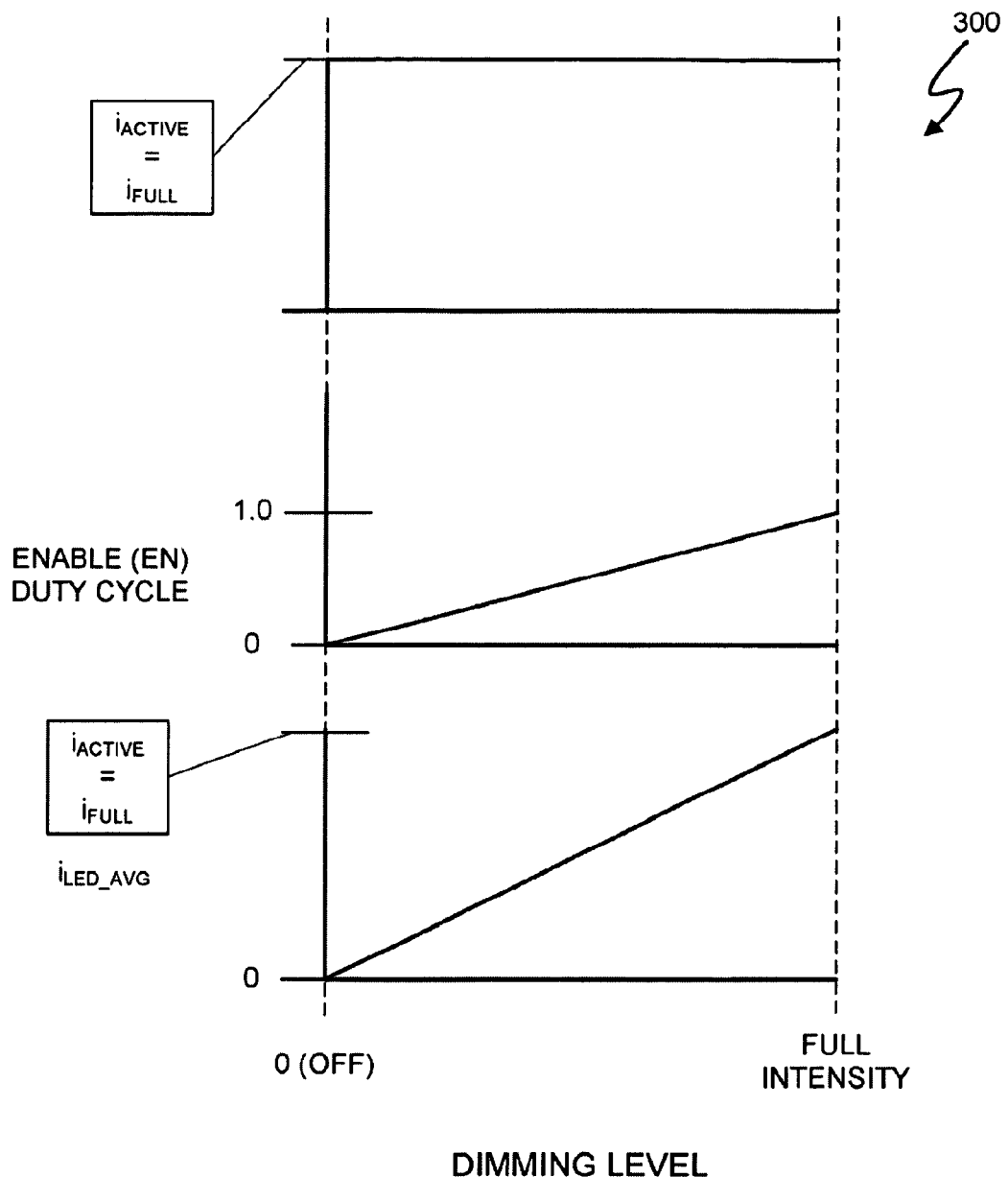
FIG. 3 (labeled prior art) depicts a graphical relationship between dimming levels and an LED current and an enable signal for the LED lighting system of FIG. 1.
Figure 4:
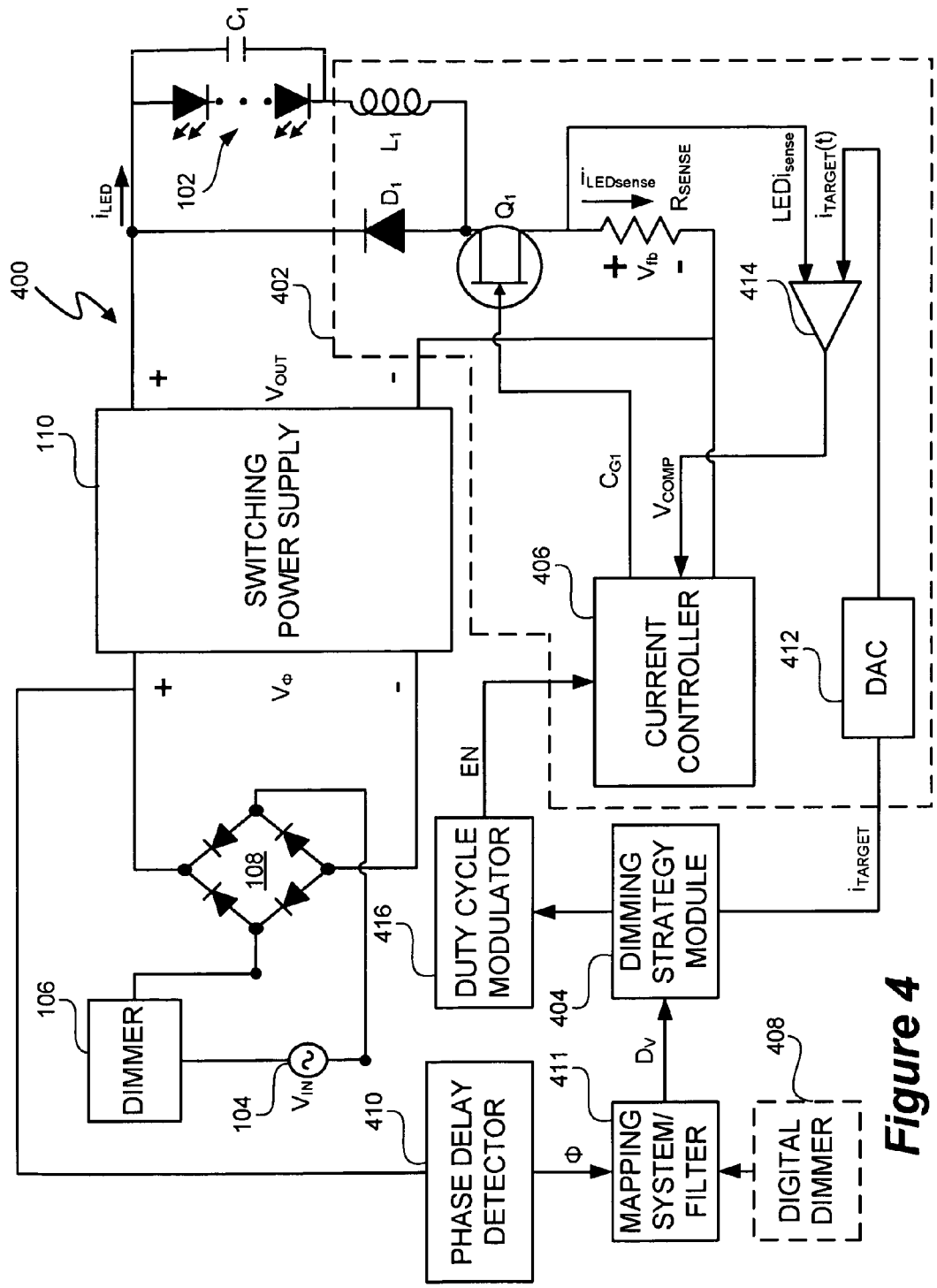
FIG. 4 depicts an LED lighting system having a dimming strategy module to vary and modulate an active LED current $i_{LED}$ in response to varying dimming levels.

FIG. 4 depicts an LED lighting system 400 that includes a current control system 402 to control the LED current $i_{LED}$. The LED lighting system 400 also includes a dimming strategy module 404 to vary and modulate an active value of LED current $i_{LED}$ in response to varying dimming levels and in accordance with a dimming strategy described subsequently in more detail. In at least one embodiment, the LED lighting system 400 also includes the voltage source 104, dimmer 106, rectifier 108, and switching power supply 110, which operate as previously described.

The current control system 402 includes a current controller 406 to generate a duty cycle modulated gate control signal $C_{G1}$ to control conductivity of FET Q1 and, thus, control LED current $i_{LED}$. Control signal $C_{G1}$ charges and discharges a gate of FET Q1. A logical 1 value of control signal $C_{G1}$ causes FET Q1 to conduct and draws LED current $i_{LED}$ through LEDs 102 and inductor L1, and a logical 0 value of controls signal $C_{G1}$ causes FET Q1 to be non-conductive. FET Q1 represents one embodiment of a switch and can be replaced by any type of switch.

In at least one embodiment, the LED lighting system 400 dims the LEDs 102 in conformity with a dimming level input generated by a dimmer such as phase cut dimmer 106. The number of LEDs 102 is a matter of choice. LEDs 102 can be replaced by a single LED. The LED lighting system 400 can receive dimmer signals indicating dimming levels from LEDs 102 from any type of dimmer. For example, dimmer 106 can be omitted, and LED lighting system 400 can include a dimmer, such as digital dimmer 408 or a dimmer having a direct current (DC) dimming control voltage (not shown). In at least one embodiment, the digital dimmer 408 is a digital addressable lighting interface (DALI) compatible dimmer. Digital dimmer 408 is depicted with "dashed" lines because generally LED lighting system 400 includes one dimmer or another but not two dimmers. Thus, in at least one embodiment, digital dimmer 408 is a substitute for dimmer 106 and phase delay detector 410. The dimmers, such as dimmer 106 and digital dimmer 408, receive inputs, either manually or automatically, that set the dimming level values to be output by the dimmers.

In at least one embodiment, the current controller 406 responds to a dimming level input and generates the control signal $C_{G1}$ in accordance with a dimming strategy that, in at least one embodiment, includes two modes of operation. In an active value varying mode of operation, the current controller 406 varies an active value of the LED current $i_{LED}$ in conformity with the dimming level for a first set of dimming levels. In an active value, duty cycle modulation mode of operation, the current controller 406 modulates a duty cycle of an active value of the LED current $i_{LED}$ in conformity with the dimming level for a second set of dimming levels.

To determine which of the two modes of operation to use in generating the LED current $i_{LED}$, LED lighting system 400 first detects a dimming level for LEDs 102. When LED lighting system 400 includes dimmer 106, the LED lighting system 400 also includes a phase delay detector 410 to detect phase delays in the phase modulated signal $V_{\phi}$. The phase delay detector 410 generates a phase delay signal ($\Phi$, and the phase delays represented by the digital phase delay signal $\Phi$ represent dimming levels. Melanson III describes an exemplary embodiment of phase delay detector 410.

In at least one embodiment, the LED lighting system 400 also includes an optional mapping system and filter 411 to map the dimming levels indicated by the phase delay signal $\Phi$ to predetermined digital values of dimming signal $D_V$. Melanson IV describes an exemplary mapping system and filter 420 that maps values of dimming signal $D_V$ to perceived light levels. The LED lighting system 400 receives the dimming signal $D_V$ as a dimming level input. In at least one embodiment, LED lighting system 400 omits the mapping system and filter 411, and the dimming strategy module 404 receives the phase delay signal $\Phi$ as a direct, digital dimmer signal input having values indicating dimming levels.

Figure 5:
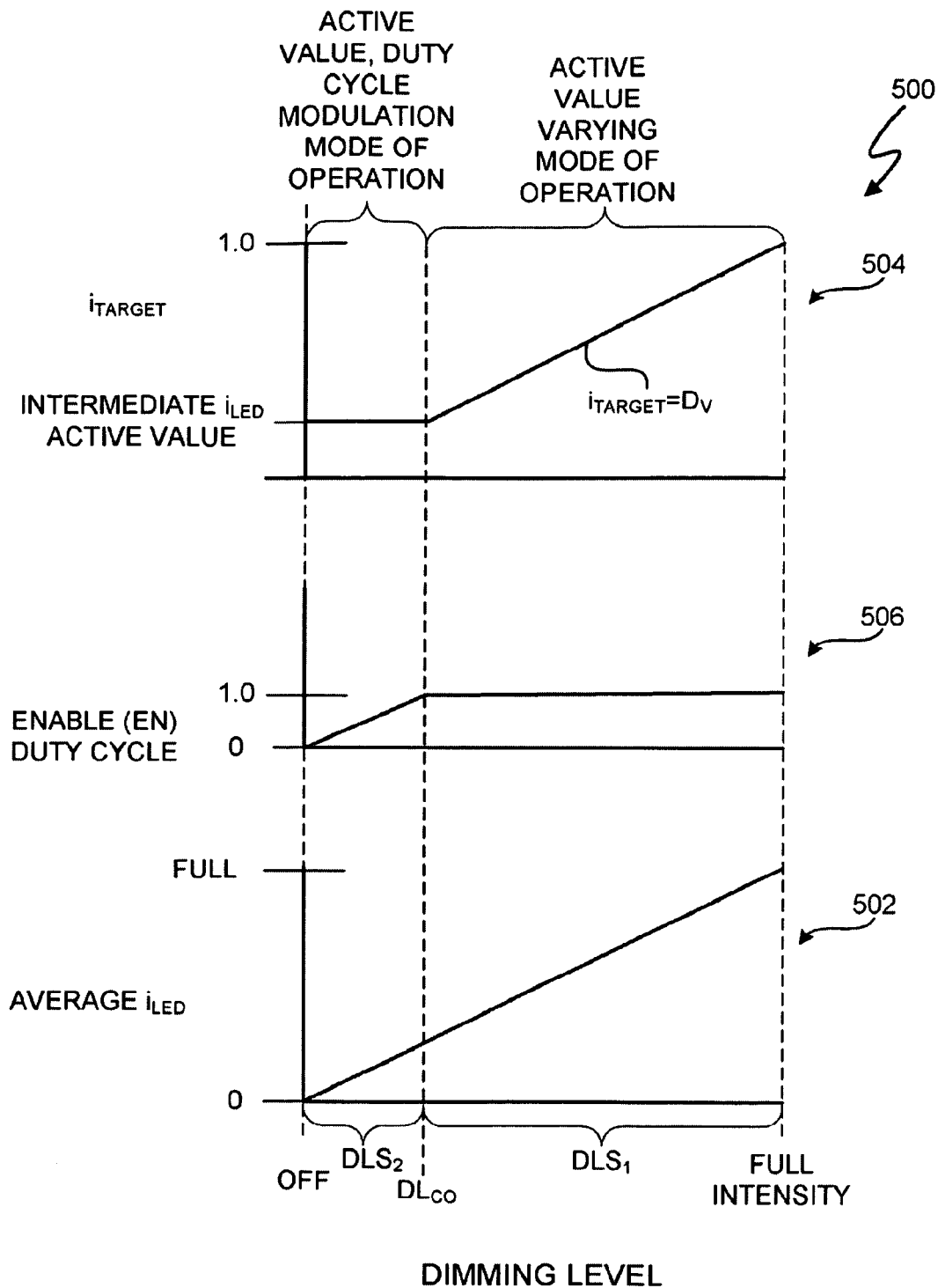
FIG. 5 depicts a dimming strategy representation.

FIG. 5 depicts a dimming strategy representation 500, which represents one embodiment of a dimming strategy of dimming strategy module 404 (FIG. 4) having the two modes of operation and a resulting average LED current $i_{LED}$. Referring to FIGS. 4 and 5, the dimming strategy module 404 receives the dimming signal $D_V$ and generates two signals, $i_{TARGET}$ and $EN_V$, whose values are based on the dimming level indicated by dimming signal $D_V$. The LED current target signal $i_{TARGET}$ is an input signal to current control system 402 and represents a scaled target value for an active value of LED current $i_{LED}$. Enable value signal $EN_V$ represents a value indicating a duty cycle of enable signal EN, which also represents a duly cycle of the LED current $i_{LED}$ during the active value, duty cycle modulation mode of operation. The enable signal EN is an input to current control system 402.

The dimming levels are divided into a first set of dimming levels $DLS_1$ and a second set of dimming levels $DLS_2$. In at least one embodiment, the first set of dimming levels $DLS_1$ range from a changeover dimming level $DL_{CO}$ to a full intensity dimming level $DL_{FULL}$, and the second set of dimming levels $DLS_2$ range from OFF to the changeover dimming level $DL_{CO}$. The changeover dimming level $DL_{CO}$ is a matter of design choice and, as described subsequently in more detail, preferably corresponds to a value of $i_{TARGET}$ that avoids operating inductor L1 in discontinuous conduction mode. The dimming level strategy module 404 causes the current control system 402 to operate in the active value varying mode of operation for the first set of dimming signals and in the duty cycle modulation mode of operation for the second set of dimming signals.

In at least one embodiment, as depicted in $i_{TARGET}$ waveform 504, in the active value varying mode of operation for the first set of dimming levels $DLS_1$, the target signal $i_{TARGET}$ equals the value of dimming signal $D_V$ and, thus, directly tracks the dimming levels indicated by dimming signal $D_V$. As depicted in enable waveform 504, the value of enable value signal $EN_V$ is set so that the enable signal EN is a logical 1 and does not affect the generation of control signal $C_{G1}$ in the active value varying mode of operation. Thus, in at least one embodiment, in the active value varying mode of operation, the current control system 402 does not duty cycle modulate the active value of LED current $i_{LED}$. The digital target signal $i_{TARGET}$ is converted to an analog signal $i_{TARGET}(t)$ by digital-to-analog converter (DAC) 412. Comparator 414 compares the signal $i_{TARGET}(t)$ with feedback signal $LEDi_{sense}$ and generates a comparison signal $V_{COMP}$ representing the comparison between the signal $i_{TARGET}(t)$ with feedback signal $LEDi_{sense}$. The feedback signal $LEDi_{sense}$ represents a value of LED current $i_{LED}$ when FET Q1 conducts.

In at least one embodiment, $LEDi_{sense}$ represents the feedback voltage $V_{fb}$ across sense resistor $R_{SENSE}$. The current $i_{LEDsense}$ represents the LED current $i_{LED}$ when FET Q1 conducts. The feedback signal $LEDi_{sense}$ and target signal $i_{TARGET}$ are scaled so that if the comparison signal $V_{COMP}$ indicates that the feedback signal $LEDi_{sense}$ is greater than the target signal $i_{TARGET}$, then current control system 402 decreases the average value of LED current $i_{LED}$. If the comparison signal $V_{COMP}$ indicates that the feedback signal $LEDi_{sense}$ is less than the target signal $i_{TARGET}$, then current control system 402 increases the average value of LED current $i_{LED}$. Since the value of target signal $i_{TARGET}$ tracks the dimming levels indicated by dimming signal $D_V$ for the first set of dimming levels, the value of the comparison signal $V_{COMP}$ causes the current control system 402 to control the LED current $i_{LED}$ so that the average value of the LED current $i_{LED}$ dims LEDs 102 to a dimming level indicated by dimming signal $D_V$.

During the active value varying mode of operation, the current controller 406 receives the comparison signal $V_{COMP}$ and generates a control signal $C_{G1}$ that causes the active value of LED current $i_{LED}$ to vary in accordance with the dimming levels indicated by the dimming signal $D_V$ for the first set of dimming levels $DLS_1$. Melanson V describes at least one embodiment of generating control signal $C_{G1}$ to cause the active value of LED current $i_{LED}$ to vary in accordance with the dimming levels. During an active period of LED current $i_{LED}$, the control signal $C_{G1}$ has an active frequency greater than or equal to 20 kHz, such as in the range of 20 kHz to 500 kHz. As described subsequently in more detail, the duty cycle modulated frequency is less than the active frequency. The active period of LED current $i_{LED}$ is the period of time when the average value of LED current $i_{LED}$ equals $i_{FULL}$. The time period for this average is, for example, one or a few (such as 3-5) periods of the active frequency. During an active period of LED current $i_{LED}$, the control signal $C_{G1}$ varies between logical 1 and logical 0. In at least one embodiment, the active period of LED current $i_{LED}$ is a period of time when the control signal $C_{G1}$ is switching at the 20-500 kHz rate, stated in another way, the active period of LED current $i_{LED}$ is a period of time when the active value of LED current $i_{LED}$ is not approximately zero. In at least one embodiment, the current control system 402 and LED current $i_{LED}$ are inactive only during the active value, duty cycle modulation mode or operation. In at least one embodiment, the inactive period corresponds to a period of time when enable signal EN is 0 and the control signal $C_{G1}$ is not switching at the active frequency. The LED current $i_{LED}$ in the LEDs 102 during the transition from an active period to an inactive period, and vice versa, is generally not well controlled. By reducing the active value of the LED current $i_{LED}$ during the active value, duty cycle modulation mode or operation, the uncertainty of this effect is reduced.

Figure 6:
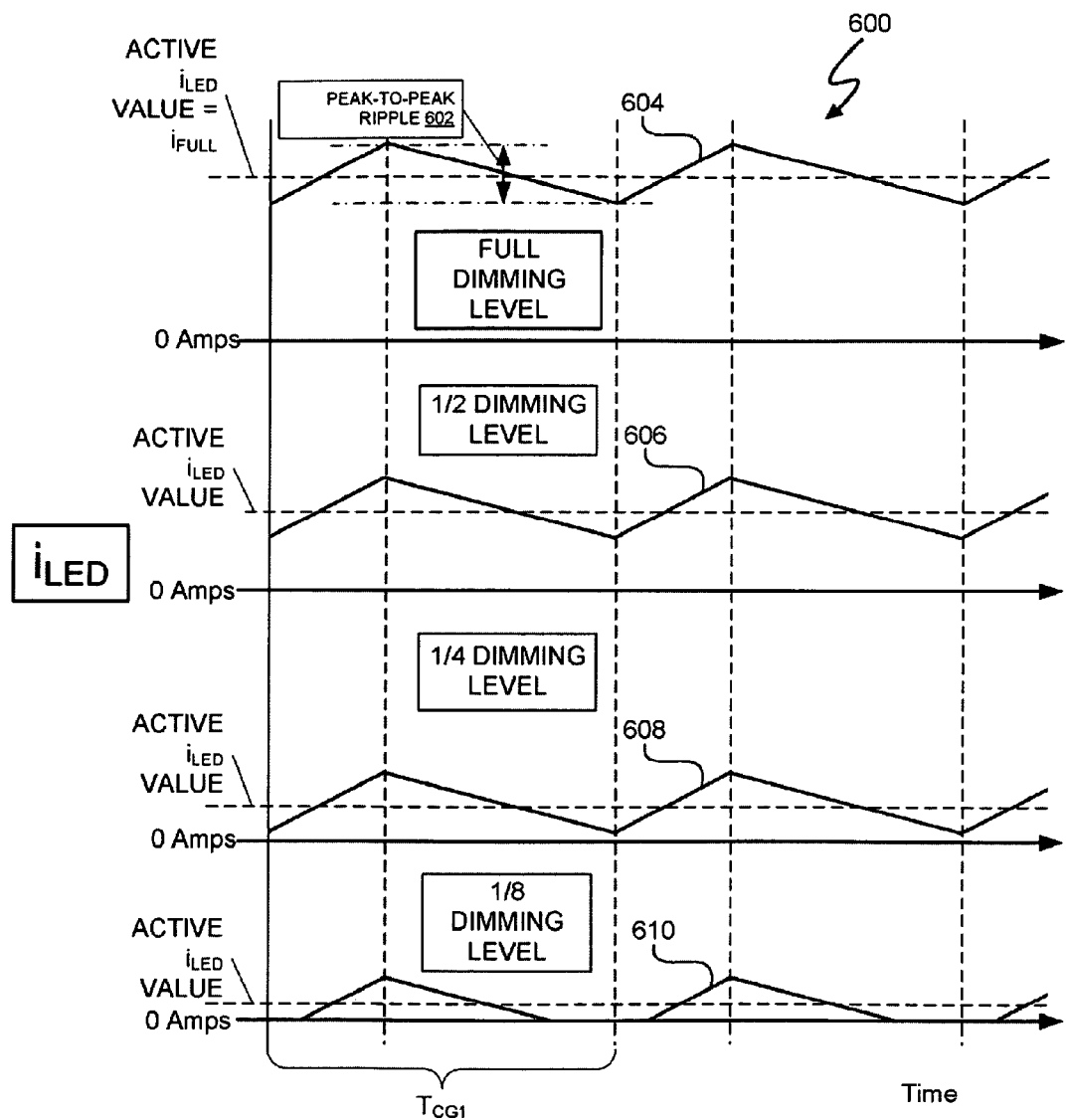
FIG. 6 depicts an exemplary LED current $i_{LED}$ graphical representation for various dimming levels.

FIG. 6 depicts an exemplary LED current $i_{LED}$ waveforms 600 of current $i_{LED}$ at various dimming levels. Referring to FIGS. 4 and 6, as control signal $C_{G1}$ causes FET Q1 to switch ON and OFF, the inductor L1 charges and discharges. Charging and discharging inductor L1 is at least one cause for the ripple 602 in LED current $i_{LED}$. The ripple 602 has a period $T_{CG1}$, which is the same as the period of control signal $C_{G1}$ during the active period. The active frequency equals $1/T_{CG1}$. The peak-to-peak value of ripple 602 depends upon the particular components of LED lighting system 400 such as the values of inductor L1 and capacitor C1. In at least one embodiment, the peak-to-peak value of ripple 602 is 200 mA, and the full active value $i_{FULL}$ of LED current $i_{LED}$ is 400 mA. The LED current $i_{LED}$ waveforms 600 assume little filtering by capacitor C1 so that the switching behavior of current control system 402 and LED current $i_{LED}$ can be better understood. In typical applications, capacitor C1 would provide more smoothing to reduce the peak-to-peak voltage of ripple 602.

Current controller 406 decreases the active value of LED current $i_{LED}$ in conformity with decreasing dimming levels indicated by dimming signal $D_V$. The LED current $i_{LED}$ waveform 604 depicts no dimming (i.e. full brightness of LEDs 102), and the active value of LED current $i_{LED}$ equals the full active value $i_{FULL}$. At a ½ dimming level, the active value of LED current $i_{LED}$ decreases to approximately ½ of the full active value $i_{FULL}$ as depicted in LED current $i_{LED}$ waveform 606. At a ¼ dimming level, the active value of LED current $i_{LED}$ decreases to approximately ¼ of the full active value $i_{FULL}$ as depicted in LED current $i_{LED}$ waveform 608. At a ⅛ dimming level, the active value of LED current $i_{LED}$ decreases to approximately ⅛ of the full active value $i_{FULL}$ as depicted in LED current $i_{LED}$ waveform 610. As long as the LED current $i_{LED}$ is above zero for the entire period $T_{CG1}$ of control signal $C_{G1}$, the inductor L1 operates in continuous conduction mode (CCM). However, at the ⅛ dimming level, the ripple 602 of LED current $i_{LED}$ causes to drop to zero amps during a portion of the period $T_{CG1}$ of control signal $C_{G1}$. When the LED current $i_{LED}$ drops to zero, the inductor L1 begins operating in discontinuous conduction mode. Thus, at some value of LED current $i_{LED}$ conforming to a dimming level between ¼ dimming level and ⅛ dimming level, the operation of inductor L1 changes from CCM to DCM.

With a 400 mA full active value and a 200 mA peak-to-peak ripple value, in the active value varying mode of operation, the LED current $i_{LED}$ can vary by an approximately 4:1 ratio before the inductor L1 begins operating in discontinuous conduction mode (DCM). Operating inductor L1 in DCM can be difficult and can require more complicated algorithms to ensure that the light intensity of LEDs 102 conforms to a dimming level indicated by dimming signal $D_V$. For example, when operating in DCM to accurately dim LEDs 102, current controller 406 typically requires data indicating a precise operational frequency of control signal $C_{G1}$ and typically requires data indicating a precise inductance value of the inductor $L_1$. Precise data indicating the operational frequency can be difficult to acquire if the operational frequency is derived from an imprecise source, such as a resistor-capacitor (RC) based oscillator. Precise data indicating the inductance value of inductor $L_1$ can be difficult to acquire because inductor values in LED light sources 204 can vary by, for example, 20% of a specified value. Thus, imprecise operational parameter data typically indicates the development and execution of more complicated algorithms and processing by current controller 406 to accurately dim the LEDs 102.

Referring to FIGS. 4 and 5, for dimming levels in the set of dimming levels $DLS_1$, the average LED current $i_{LED}$ varies in linear proportion to the value of signal $i_{TARGET}$. To avoid operating inductor L1 in DCM, dimming strategy module 404 causes current controller 406 to operate in the active value, duty cycle modulation mode of operation when the dimming level indicated by dimming signal $D_V$ indicates dimming levels at or below the changeover dimming level $DL_{CO}$, i.e. within the set of dimming levels $DLS_2$. When the dimming strategy module 404 detects a dimming level within the set of dimming levels $DLS_2$, the dimming strategy module 404 maintains the target signal $i_{TARGET}$ at a value corresponding to an LED current $i_{LED}$ greater than or equal to a minimum active value and less than the full active value $i_{FULL}$. In at least one embodiment, the dimming strategy module 404 detects which set a dimming level belongs to by comparing the dimming level indicated by dimming signal $D_V$ with the changeover dimming level $DL_{CO}$. The intermediate active value of the LED current $i_{LED}$ is, in at least one embodiment, an active value less than the full active value $i_{FULL}$ that ensures inductor L1 will operate in CCM. A lower active value of LED current $i_{LED}$ is preferable to, for example, increase the efficiency and decrease the noise of LED lighting system 400 by decreasing the current in inductor L1. Flicker of LEDs 102 is also reduced at low dimming levels, i.e. low brightness levels of LEDs 102.

In at least one embodiment, the minimum active value of the LED current $i_{LED}$ is the lowest active value of LED current $i_{LED}$ that ensures CCM operation of inductor L1 and below the full active value $i_{FULL}$. In at least one embodiment, the intermediate active value of LED current $i_{LED}$ is set just above the minimum active value of LED current $i_{LED}$ to provide an operating margin to ensure CCM operation of inductor L1. In at least one embodiment, the intermediate active value of LED current $i_{LED}$ is $0.25 \cdot i_{FULL}$ for an LED current $i_{LED}$ having a peak-to-peak ripple 602 equal to 50% of the full active value $i_{FULL}$.

As depicted in FIG. 5, when the dimming level indicated by dimming signal $D_V$ indicates a dimming level within the set of dimming levels $DLS_2$, the target signal $i_{TARGET}$ is held constant at the intermediate active value of LED current $i_{LED}$, which is for example, 0.25. So that LED current $i_{LED}$ is able to decrease below an active value corresponding to a ¼ dimming level, the current controller 406 generates a control signal $C_{G1}$ to duty cycle modulate the LED current $i_{LED}$ for dimming levels in the set of dimming levels $DLS_2$.

Referring to FIGS. 4 and 5, to duty cycle modulate the LED current $i_{LED}$ during the active value, duty cycle modulation mode of operation, the dimming strategy module 404 generates an enable value $EN_V$ between 0 and 1. In at least one embodiment, the value of enable value $EN_V = [(\text{dimming level})/(i_{TARGET}/i_{TARGET\_FULL})]$, where $i_{TARGET\_FULL}$ is the value of the target signal $i_{TARGET}$ corresponding to a full value $i_{FULL}$ of LED current $i_{LED}$. In at least one embodiment, the signal $i_{TARGET}$ is scaled so that $i_{TARGET\_FULL}$ equals 1, and the value of enable value $EN_V$=[(dimming level)/$i_{TARGET}$]. For the set of dimming levels $DLS_2$, the average LED current $i_{LED}$ tracks the product of the enable value $EN_V$ and the target signal $i_{TARGET}$.

In at least one embodiment, the enable value $EN_V$ is a digital value that is converted into a duty cycle modulated enable signal EN by duty cycle modulator 416. In at least one embodiment, duty cycle modulator 416 is a pulse width modulator. In another embodiment, duty cycle modulator 416 is a delta-sigma modulator. A delta-sigma modulator varies the value of enable signal EN over time; however, the average value of enable signal EN equals the enable value $EN_V$. The delta-sigma modulator version of duty cycle modulator 416 can be any delta-sigma modulator such as any first order or multi-order delta-sigma modulator described in, for example, *Understanding Delta-Sigma Data Converters* by Schreier and Temes, IEEE Press, 2005, ISBN 0-471-46585-2 or as available from Cirrus Logic Inc. of Austin, Tex., U.S.A. Delta-sigma duty cycle modulation allows for lower flicker of LEDs 102 than PWM modulation at the lower rates.

Referring to FIGS. 4 and 5, during the active value, duty cycle modulation mode of operation, dimming strategy module 404 generates a target signal $i_{TARGET}$ corresponding to the intermediate active LED current $i_{LED}$ current for the active value, duty cycle modulation mode of operation as, for example, depicted in $i_{TARGET}$ waveform 501. The dimming strategy module 404 also generates an enable signal EN as previously described and as, for example, depicted in enable waveform 504. With the target signal $i_{TARGET}$ fixed, the current controller 406 generates a duty cycle modulated control signal $C_{G1}$ corresponding to the dimming level indicated in the set of dimming levels $DLS_2$. Duty cycle modulating the control signal $C_{G1}$ also duty cycle modulates the LED current $i_{LED}$. Thus, in at least one embodiment, the average LED current $i_{LED}$ conforms to the full range of dimming levels from OFF to full intensity as indicated in by the average LED current $i_{LED}$ versus dimming level waveform 502.

Figure 7:
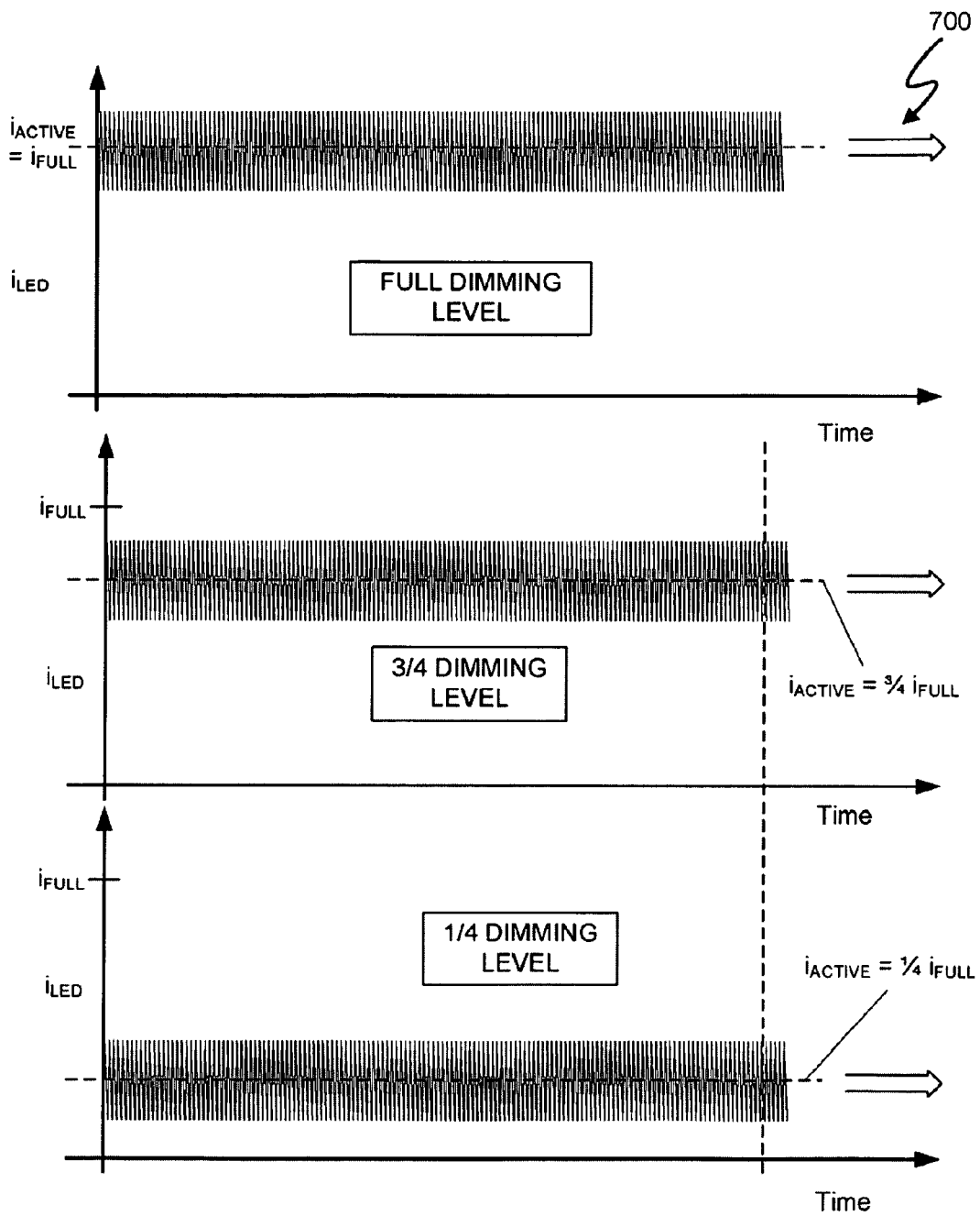
FIG. 7 depicts an exemplary LED current waveforms for dimming levels within a first set of dimming levels.

FIG. 7 depicts exemplary LED current $i_{LED}$ waveforms 700 for dimming levels within the set of dimming levels $DLS_1$ greater than the changeover dimming level $DL_{CO}$. For a full dimming level, the active value of LED current $i_{LED}$ equals $i_{FULL}$. For ¾ dimming level, the active value of LED current $i_{LED}$ equals ¾·$i_{FULL}$. For a ¼ dimming level, the active value of LED current $i_{LED}$ equals the exemplary intermediate active value of ¼·$i_{FULL}$. Referring to FIGS. 5 and 7, the average LED current $i_{LED}$ conforms to the dimming level indicated by the dimming signal $D_V$ throughout the dimming levels in the set of dimming levels $DLS_1$ without causing inductor L1 to enter DCM. In at least one embodiment, the active value of LED current $i_{LED}$ can be varied over time so that the average active value of LED current $i_{LED}$ equals the active value of LED current $i_{LED}$ depicted in waveforms 700 in order to, for example, spread the spectrum of the switching frequency of FET Q1.

Figure 8:
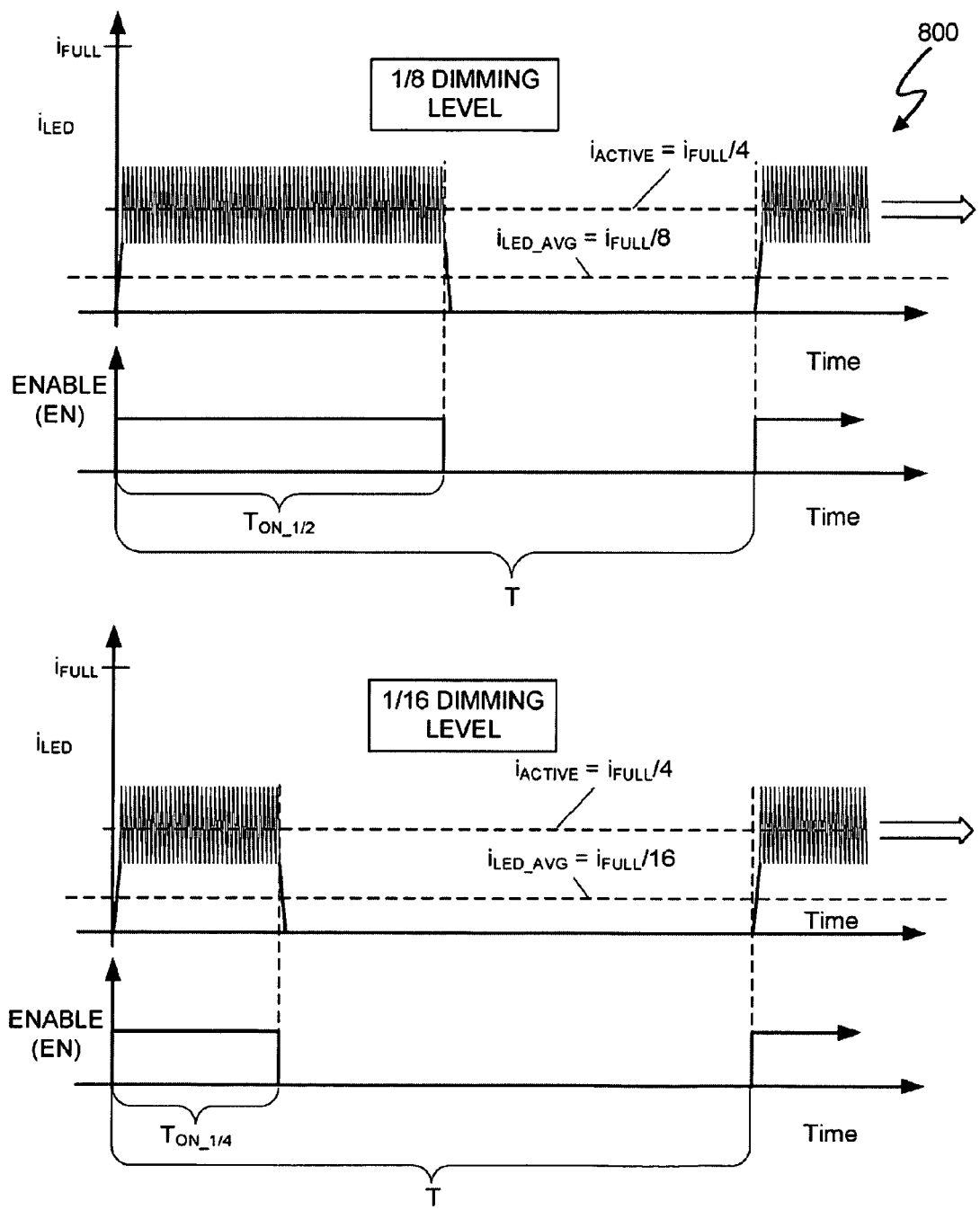
FIG. 8 depicts an exemplary LED current waveforms for dimming levels within a second set of dimming levels.

FIG. 8 depicts exemplary LED current $i_{LED}$ waveforms 800 for dimming levels within the set of dimming levels $DLS_2$. In the embodiment of waveforms 800, the intermediate active value of LED current $i_{LED}$ is $i_{FULL}$/4. For a ⅛ dimming level, the duty cycle ($T_{ON\_1/2}$/T) of enable signal EN is set by dimming strategy module 404 to 0.5 so that average LED current $i_{LED}$ equals 0.5·(intermediate active value of LED current $i_{LED}$)=0.5·($i_{FULL}$/4). Thus, the value of LED current $i_{LED}$ equals the active value $i_{FULL}$/4 for ½ of the period of enable signal EN for a dimming level of ⅛. For a 1/16 dimming level, the duty cycle ($T_{ON\_1/4}$/T) of enable signal EN is set by dimming strategy module 404 to 0.25 so that average LED current $i_{LED}$ equals 0.25·(intermediate active value of LED current $i_{LED}$)=0.25·($i_{FULL}$/4). Thus, the value of LED current $i_{LED}$ equals the active value $i_{FULL}$/4 for ¼ of the period of enable signal EN for a dimming level of 1/16. In at least one embodiment, the period of enable signal EN equals the period of the phase modulated signal $V_Φ$. In general, in the active value, duty cycle varying mode of operation, the average LED current $i_{LED}$ equals the duty cycle ($T_{ON}$/T) of the enable signal EN times the active value of LED current $i_{LED}$. Period $T_{ON}$ represents the active period of LED current $i_{LED}$ and current control system 402, and $T-T_{ON}$ represents an inactive period for each period T of enable signal EN. 1/T represents the duty cycle modulation frequency of control signal $C_{G1}$ and LED current $i_{LED}$.

Figure 9:
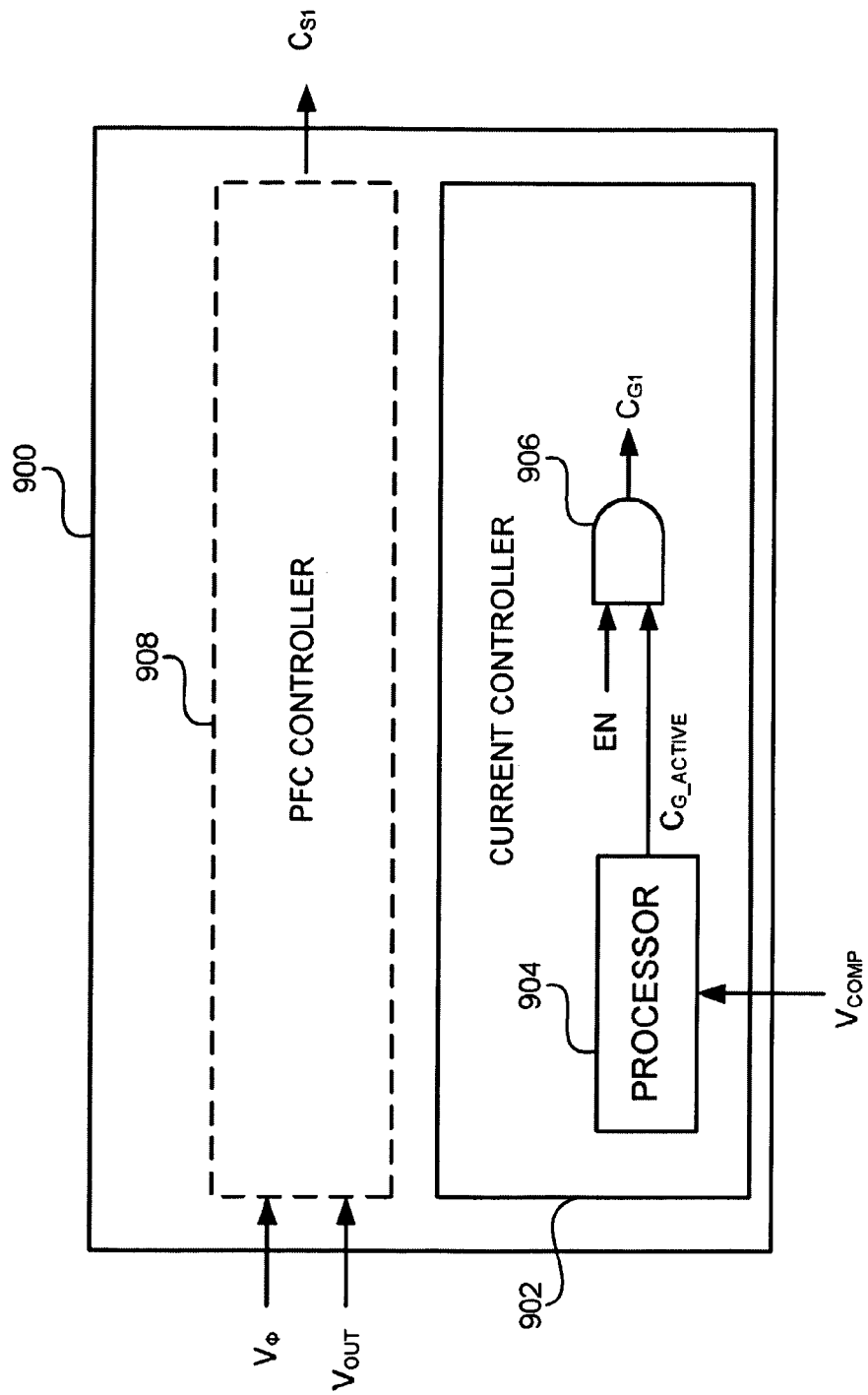
FIG. 9 depicts an exemplary, logical representation of an LED lighting system controller.

FIG. 9 depicts an exemplary, logical representation of an LED lighting system controller 900. Controller 900 includes current controller 902, and current controller 902 represents one embodiment of current controller 406. Controller 900 is depicted "logically" and can be physically implemented in any of a variety of ways. One of the components of current controller 902 is processor 904. Processor 904 includes an input to receive the comparison signal $V_{COMP}$, and processor 904 generates signal $C_{G\_ACTIVE}$. In at least one embodiment, processor 904 generates signal $C_{G\_ACTIVE}$ in the same manner as Melanson V describes generating a control signal to control a switch such as FET Q1. FIG. 9 depicts an AND gate 906 with respective inputs for enable signal EN and signal $C_{G\_ACTIVE}$. The AND gate 906 is exemplary, and in general, the AND function of AND gate 906 is merged into the implementation of the current control system 402. For the set of dimming levels $DLS_1$ during the active value varying mode of operation, the enable signal EN equals 1, thus, the control signal $C_{G1}$ equals the signal $C_{G\_ACTIVE}$. For the set of dimming levels $DLS_2$ during the active value, duty cycle modulation mode of operation, the current controller 902 duty cycle modulates the control signal $C_{G1}$ in accordance with the logical value of enable signal EN to generate duty cycle modulated control signal $C_{G1}$. Thus, when the enable signal EN equals logical 1, the control signal $C_{G1}$ equals signal $C_{G\_ACTIVE}$, and when the enable signal EN equals 0, the control signal $C_{G1}$ equals 0.

In at least one embodiment, the controller 900 also includes a power factor correction (PFC) controller 908. The PFC controller 908 processes feedback signals representing the phase modulated signal $V_Φ$ and the output voltage $V_{OUT}$ of switching power supply 110 to generate a power factor correction control signal $CS_1$. The control signal $CS_1$ controls a switch (not shown) in switching power supply 110 to control power factor correction and the output voltage $V_{OUT}$ of switching power converter 110 as, for example, described in Melanson VI, VII, VIII, IX, and X.

Figure 10:
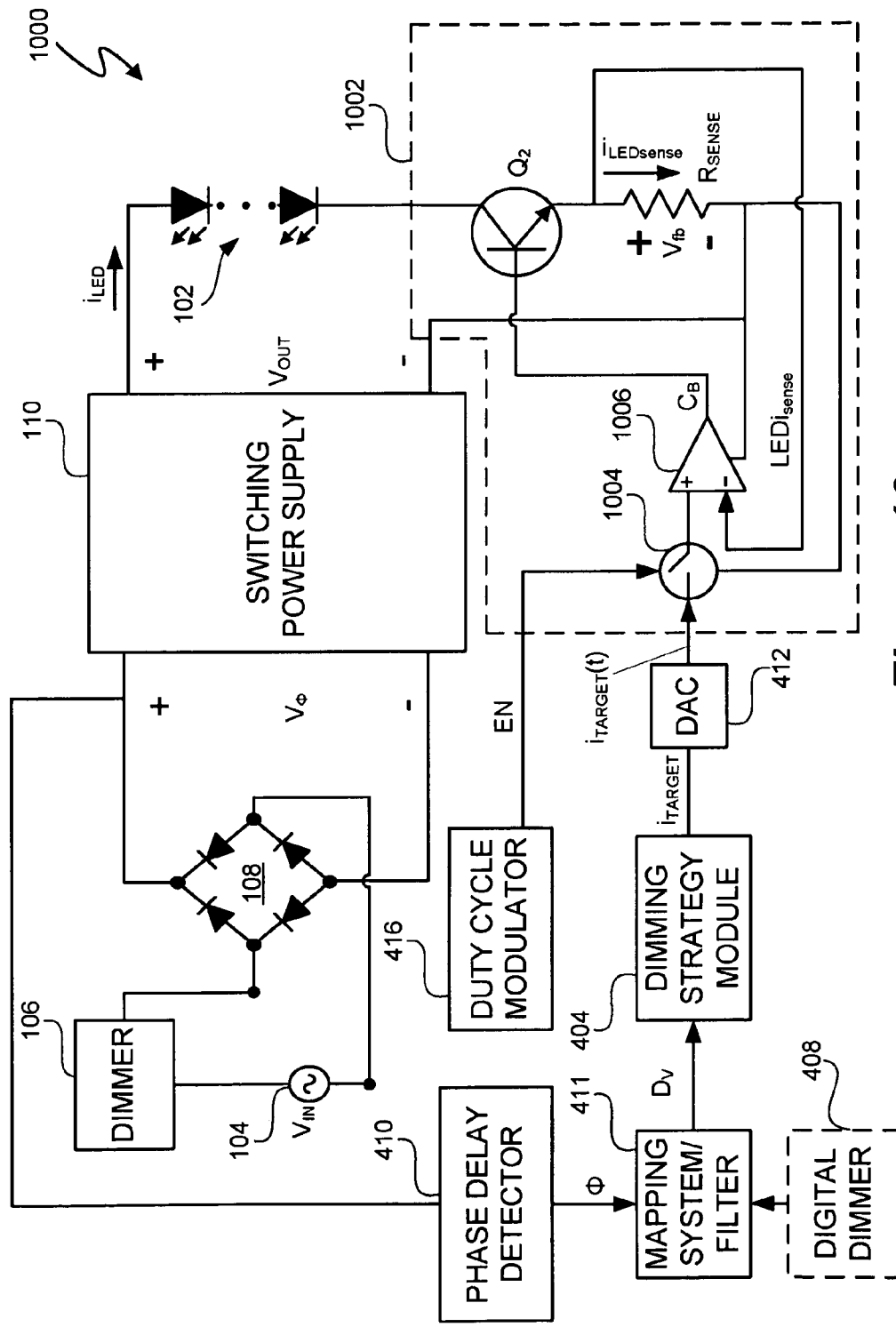
FIG. 10 depicts an LED lighting system that includes an analog current control system.

FIG. 10 depicts an LED lighting system 1000 that includes a linear current control system 1002. The linear current control system 1002 controls a linear LED current $i_{LED}$ by varying an active value of the LED current $i_{LED}$ for a first set of dimming levels and duty cycle modulating an intermediate active value of LED current $i_{LED}$ for a second set of dimming levels. Because the LED lighting system 1000 does not include an inductor L1, ripple 602 (FIG. 6) is not present in LED current $i_{LED}$. Thus, the intermediate active value of LED current $i_{LED}$ is a matter of design choice. In at least one embodiment, the intermediate active value of LED current $i_{LED}$ for LED lighting system 1000 is set between 10% and 90% of the full active value $i_{FULL}$. In at least one embodiment, the dimming levels in the first set are dimming levels corresponding to dimming levels generated by an LED current $i_{LED}$ between the intermediate active value and the full active value $i_{FULL}$. The dimming levels in the second set represent all the dimming levels not in the first set.

When the enable signal EN is a logical 1, switch 1004 conducts, and the analog target signal $i_{TARGET}(t)$ is compared by operational amplifier 1006 to the feedback signal $LEDi_{sense}$. The operational amplifier 1006 drives the base control signal $C_B$ higher if the voltage value of $i_{TARGET}(t)$ is higher than the value of feedback signal $LEDi_{sense}$ to cause the transistor Q2 to conduct more LED current $i_{LED}$. In at least one embodiment, transistor Q2 is a bipolar junction transistor (BJT) or an insulated gate bipolar junction transistor. The operational amplifier 1006 drives the base control signal $C_B$ lower if the voltage value of $i_{TARGET}(t)$ is lower than the value of feedback signal $LEDi_{sense}$ to cause transistor Q2 to conduct less LED current $i_{LED}$. The enable signal EN causes the linear current control system 1002 to duty cycle modulate the active value of LED current $i_{LED}$ for the second set of dimming levels.

In at least one embodiment, the LED lighting system 400 of FIG. 4 includes an auxiliary power supply (not shown), such as a +15V to +20 V power supply, to provide sufficient power to logic and drive components of LED lighting system 400 other than, for example, the dimmer 106, the switching power supply 110, and LEDs 102. In at least one embodiment, the auxiliary power supply (not shown) provides power to the current control system 402, the phase delay detector 410, the mapping system/filter 411, the digital dimmer 408, the dimming strategy module 404, the duty cycle modulator 416, and the DAC 412.

Thus, the LED lighting systems 400 and 1000 control LED current $i_{LED}$ in one or more LEDs 102 in response to a dimming level input. The LED lighting systems 400 and 1000 implement respective dimming strategies having two modes of operation that allow the LED lighting system to dim the LEDs using an active value of LED current $i_{LED}$ less than a full value of the LED current $i_{LED}$.

Although the present invention has been described in detail, it should be understood that various changes, substitutions and alterations can be made hereto without departing from the spirit and scope of the invention as defined by the appended claims.

What is claimed is:

1. A light emitting diode (LED) lighting system comprising:
    a controller to control current in an LED, wherein the controller includes components to respond to a dimming level input to control an active value of the LED current, wherein:
        for a first set of dimming levels, the active value varies between a full active value and an intermediate active value of the LED current; and
        for a second set of dimming levels, the LED current is duty cycle modulated;
    a dimming level strategy module coupled to the controller and having an input to receive a dimmer signal indicating a dimming level, wherein the dimming level strategy module is configured to generate a target active value of the LED current and generate a duty cycle control signal having a duty cycle control value indicating a duty cycle of the LED current, wherein (i) for the first set of dimming levels, the duty cycle control value indicates an LED current duty cycle of approximately 1.0 and (ii) for the second set of dimming levels, the duty cycle control value causes a duty cycle of the LED current to vary in response to varying dimming levels indicated by the dimmer signal; and
    a duty cycle modulator coupled to the dimming level strategy module to convert the duty cycle control value into a duty cycle modulated enable signal, wherein a duty cycle of the enable signal is approximately 1.0 for the first set of dimming levels and the duty cycle of the enable signal causes a duty cycle of the LED current to vary in response to dimming levels in the second set of dimming levels;
    wherein the controller includes components to control the active value of the LED current so that an average active value of the LED current is approximately equal to the target active value.

2. The LED lighting system of claim 1 wherein the first set of dimming levels comprises a first range of dimming levels, the second set of dimming levels comprises a second range of dimming levels, and the dimming levels in the first range of dimming levels are greater than the dimming levels in the second range of dimming levels.

3. The LED lighting system of claim 1 wherein the components of the controller respond to the dimming level input to maintain a different, approximately constant active value of the LED current for each dimming level in the first set of dimming levels and to maintain an approximately constant active value of the LED current for all dimming levels in the second set of dimming levels.

4. The LED lighting system of claim 1 wherein the full value of the LED current active value corresponds to full intensity of the LED.

5. The LED lighting system of claim 1 wherein the duty cycle modulator comprises a pulse width modulator.

6. The LED lighting system of claim 1:
    wherein the duty cycle modulator comprises a delta-sigma modulator to vary the duty cycle of the enable signal and to maintain an average duty cycle of the enable signal corresponding to a duty cycle indicated by the duty cycle control value.

7. The LED lighting system of claim 1 wherein the controller includes an input to receive an enable signal and, during operation of the controller, the enable signal is duty cycle modulated to cause the controller to duty cycle modulate the LED current for the second set of dimming levels and an average active value of the LED current for dimming levels in the second set of dimming levels is approximately equal to a duty cycle of the enable signal times a ratio of the active value of the LED current to the full value of the LED active value.

8. The LED lighting system of claim 7 wherein an average value of the LED current for dimming levels in the second set of dimming levels is approximately equal to a duty cycle of the enable signal times a ratio of the intermediate active value of the LED current to the full value of the LED active value.

9. The LED lighting system of claim 1 wherein the dimming level input indicates a dimming level generated by a member of the group consisting of: a 2-wire phase-cut dimmer, a dimmer having a direct current (DC) dimming control voltage, a dimmer having a digital dimming control signal.

10. The LED lighting system of claim 9 wherein the dimmer having a digital dimming control signal is a digital addressable lighting interface (DALI) compatible dimmer.

11. The LED lighting system of claim 1 further comprising:
    an LED light source comprising the LED;
    an inductor coupled to the LED;
    a switch coupled to the inductor to control current flow through the inductor and the LED; and
    a switching power supply coupled to the LED light source to supply power to the LED light source; wherein the controller is coupled to the switch, and the controller generates a control signal to control the active value of the LED current.

12. The LED lighting system of claim 11 wherein the controller further includes components to control power factor correction for the switching power supply.

13. The LED lighting system of claim 11 wherein the LED light source comprises multiple light emitting diodes.

14. The LED lighting system of claim 1 wherein the controller is configured to generate a control signal to control conductivity of the switch and, for the second set of dimming signals, the control signal has a frequency greater than 20 kHz and is duty cycle modulated at a frequency less than 20 kHz.

15. A method of controlling an LED lighting system comprising:
   receiving a dimmer signal indicating a dimming level;
   controlling an active value of a current in an LED in response to the dimming level, wherein controlling the active value of the LED current comprises:
      for a first set of dimming levels, varying the active value between a full active value and an intermediate active value of the LED current; and
      for a second set of dimming levels, duty cycle modulating the LED current;
   generating a target active value of the LED current;
   generating a duty cycle control signal having a duty cycle control value indicating a duty cycle of the LED current, wherein (i) for the first set of dimming levels, the duty cycle control value indicates an LED current duty cycle of approximately 1.0 and (ii) for the second set of dimming levels, the duty cycle control value varies between 1.0 and less than 0.5 in response to varying dimming levels indicated by the dimmer signal; and
   converting the duty cycle control value into a duty cycle modulated enable signal, wherein a duty cycle of the enable signal is approximately 1.0 for the first set of dimming levels and the duty cycle of the enable signal ranges from less than 1.0 to less than 0.5 for the second set of dimming levels;
   wherein controlling the active value of the LED current further comprises controlling the active value of the LED current so that an average active value of the LED current is approximately equal to the target active value.

16. The method of claim 15 wherein the first set of dimming levels comprises a first range of dimming levels, the second set of dimming levels comprises a second range of dimming levels, and the dimming levels in the first range of dimming levels are greater than the dimming levels in the second range of dimming levels.

17. The method of claim 15 controlling an active value of a current in an LED in response to the dimming level further comprises:
   maintaining a different, approximately constant active value of the LED current for each dimming level in the first set of dimming levels; and
   maintaining an approximately constant active value of the LED current for all dimming levels in the second set of dimming levels.

18. The method of claim 15 wherein the LED lighting system includes an LED light source comprising the LED, an inductor coupled to the LED, a switch coupled to the inductor to control current flow through the inductor and the LED, and a switching power supply coupled to the LED light source to supply power to the LED light source, wherein controlling an active value of a current in an LED in response to the dimming level further comprises:
   generating a control signal to control the active value of the LED current.

19. The method of claim 15 wherein generating a control signal to control the active value of the LED current further comprises:
   generating the control signal to control conductivity of a switch, wherein, for the second set of dimming signals, the control signal has a frequency greater than 20 kHz and is duty cycle modulated at a frequency less than 20 kHz.

20. The method of claim 15 wherein the full value of the LED current active value corresponds to full intensity of the LED.

21. The method of claim 15 wherein converting the duty cycle control value into a duty cycle modulated enable signal comprises:
   generating a pulse width modulated enable signal.

22. The method of claim 15 wherein converting the duty cycle control value into a duty cycle modulated enable signal comprises:
   generating a delta-sigma modulated enable signal to vary the duty cycle of the enable signal and to maintain an average duty cycle of the enable signal corresponding to a duty cycle indicated by the duty cycle control value.

23. The method of claim 15 further comprising:
   receiving an enable signal, wherein the enable signal is duty cycle modulated; and
   in response to dimming levels in the second set of dimming levels, modulating the LED current in accordance with a duty cycle of the enable signal wherein an average active value of the LED current for dimming levels in the second set of dimming levels is approximately equal to a duty cycle of the enable signal times a ratio of the active value of the LED current to the full value of the LED active value.

24. The method of claim 23 wherein an average value of the LED current for dimming levels in the second set of dimming levels is approximately equal to a duty cycle of the enable signal times a ratio of the intermediate active value of the LED current to the full value of the LED active value.

25. The method of claim 15 wherein the dimming level input indicates a dimming level generated by a member of the group consisting of: a 2-wire phase-cut dimmer, a dimmer having a direct current (DC) dimming control voltage, a dimmer having a digital dimming control signal.

26. The method of claim 25 wherein the dimmer having a digital dimming control signal is a digital addressable lighting interface (DALI) compatible dimmer.

27. The method of claim 15 wherein a power supply supplies power to the LED light source and a switch coupled to the LED light source controls current supplied by the power supply to the LED, wherein controlling the active value of the LED current further comprises:
   generating a control signal to control conductivity of the switch to control the active value of the LED current.

28. The method of claim 27 wherein the power supply comprises a switching power supply and the method further comprises:
   controlling a power factor correction for the switching power supply.

29. An apparatus for controlling an LED lighting system comprising:
   means for receiving a dimmer signal indicating a dimming level;

means for controlling an active value of a current in an LED in response to the dimming level, wherein the means for controlling the active value of the LED current comprises:
  for a first set of dimming levels, means for varying the active value between a full active value and an intermediate active value of the LED current; and
  for a second set of dimming levels, means for duty cycle modulating the LED current;
means for generating a target active value of the LED current;
means for generating a duty cycle control signal having a duty cycle control value indicating a duty cycle of the LED current, wherein (i) for the first set of dimming levels, the duty cycle control value indicates an LED current duty cycle of approximately 1.0 and (ii) for the second set of dimming levels, the duty cycle control value varies between 1.0 and less than 0.5 in response to varying dimming levels indicated by the dimmer signal; and
means for converting the duty cycle control value into a duty cycle modulated enable signal, wherein a duty cycle of the enable signal is approximately 1.0 for the first set of dimming levels and the duty cycle of the enable signal ranges from less than 1.0 to less than 0.5 for the second set of dimming levels;
wherein the means for controlling the active value of the LED current further comprises means for controlling the active value of the LED current so that an average active value of the LED current is approximately equal to the target active value.

30. A light emitting diode (LED) lighting system comprising:
  a controller to control current in an LED, wherein the controller includes components to respond to a dimming level input to control an active value of the LED current, wherein:
    for a first set of dimming levels, the active value varies between a full active value and an intermediate active value of the LED current; and
    for a second set of dimming levels, the LED current is duty cycle modulated;
    wherein the controller includes an input to receive an enable signal and, during operation of the controller, the enable signal is duty cycle modulated to cause the controller to duty cycle modulate the LED current for the second set of dimming levels and an average active value of the LED current for dimming levels in the second set of dimming levels is approximately equal to a duty cycle of the enable signal times a ratio of the active value of the LED current to the full value of the LED active value.

31. A method of controlling an LED lighting system comprising:
  receiving a dimmer signal indicating a dimming level;
  controlling an active value of a current in an LED in response to the dimming level, wherein controlling the active value of the LED current comprises:
    for a first set of dimming levels, varying the active value between a full active value and an intermediate active value of the LED current; and
    for a second set of dimming levels, duty cycle modulating the LED current;
  receiving an enable signal, wherein the enable signal is duty cycle modulated; and
  in response to dimming levels in the second set of dimming levels, modulating the LED current in accordance with a duty cycle of the enable signal wherein an average active value of the LED current for dimming levels in the second set of dimming levels is approximately equal to a duty cycle of the enable signal times a ratio of the active value of the LED current to the full value of the LED active value.

32. An apparatus for controlling an LED lighting system comprising:
  means for receiving a dimmer signal indicating a dimming level;
  means for controlling an active value of a current in an LED in response to the dimming level, wherein the means for controlling the active value of the LED current comprises:
    for a first set of dimming levels, means for varying the active value between a full active value and an intermediate active value of the LED current; and
    for a second set of dimming levels, means for duty cycle modulating the LED current;
  means for receiving an enable signal, wherein the enable signal is duty cycle modulated; and
  means for modulating the LED current in response to dimming levels in the second set of dimming levels and in accordance with a duty cycle of the enable signal wherein an average active value of the LED current for dimming levels in the second set of dimming levels is approximately equal to a duty cycle of the enable signal times a ratio of the active value of the LED current to the full value of the LED active value.

* * * * *